United States Patent [19]

Hashimoto et al.

[11] Patent Number: 5,729,699
[45] Date of Patent: Mar. 17, 1998

[54] DISPLAY APPARATUS WHICH IS CAPABLE OF DISPLAYING EVALUATION DATA WITH RESPECT TO COLORS

[75] Inventors: Kayoko Hashimoto, Ome; Yukihiro Nakano; Kyoko Lin, both of Akishima; Susumu Onodera, Ome, all of Japan

[73] Assignee: Casio Computer Co., Ltd., Tokyo, Japan

[21] Appl. No.: 359,079

[22] Filed: Dec. 19, 1994

[30] Foreign Application Priority Data

Dec. 27, 1993 [JP] Japan ................................. 5-348782
Dec. 30, 1993 [JP] Japan ................................. 5-351306
Dec. 30, 1993 [JP] Japan ................................. 5-351307

[51] Int. Cl.⁶ ............................................ G06F 19/00
[52] U.S. Cl. ......................... 395/227; 395/131; 395/135
[58] Field of Search .............................. 395/131, 135, 395/227; 364/474.34, 474.21, 478.11, 478.12

[56] References Cited

U.S. PATENT DOCUMENTS

| | | | |
|---|---|---|---|
| 1,629,330 | 5/1927 | Adler | 434/99 |
| 4,149,246 | 4/1979 | Goldman | 364/200 |
| 4,539,585 | 9/1985 | Spackova et al. | 382/100 |
| 4,682,956 | 7/1987 | Krane | 434/237 |
| 4,709,230 | 11/1987 | Popowski et al. | 345/153 |
| 4,800,510 | 1/1989 | Vinberg et al. | 395/140 |
| 4,854,880 | 8/1989 | Nasby | 434/395 |
| 4,862,497 | 8/1989 | Seto et al. | 379/355 |
| 4,878,055 | 10/1989 | Kasahara | 341/23 |
| 5,375,195 | 12/1994 | Johnston | 395/135 |
| 5,404,426 | 4/1995 | Usami et al. | 395/120 |
| 5,412,578 | 5/1995 | Takagi et al. | 364/474.34 |
| 5,495,602 | 2/1996 | Harada et al. | 395/600 |
| 5,579,034 | 11/1996 | Aoyama et al. | 345/168 |
| 5,608,852 | 3/1997 | Hashimoto et al. | 395/135 |

OTHER PUBLICATIONS

Nelson, Alexandra, "West Coast Notes; Multiple Brief Articles on Clothing Industry News on the West Coast", Information Access Company, vol. 23, No. 209, p. 5, Nov. 2, 1993.

Waltz, "Prospects for Building a Truly Intelligent Machine", Daedalus Journal of the American Academy of Arts and Sciences, vol. 117, No. 1, pp. 191–212, 1988.

Melvin D. Sanuders; Color & Light Therapy; Jan./Feb./Mar. 1992; pp. 21–24; Extraordinary Science.

Harvey P. Newquist III; Experts At Retail; Apr. 1, 1990; pp. 53–56; Datamation.

*Primary Examiner*—Mark K. Zimmerman
*Attorney, Agent, or Firm*—Frishauf, Holtz, Goodman, Langer & Chick

[57] ABSTRACT

A display system comprising a display and a memory for storing a plurality of evaluation data relating to a plurality of types of clothing and accessories. Each type of clothing and accessory has a respective plurality of colors. The display is controlled to display the plurality of types of clothing, a plurality of types of accessories to be carried, and the respective plurality of colors of each of the types of clothing and accessories. A designating device is provided for designating particular combinations of clothing and/or accessories. When a first article of clothing of a designated color is combined with a second article of clothing and its designated color, an evaluation of this combination is performed based on the stored plurality of evaluation data, and the resulting evaluation is displayed on the display. Further, when a designated color of clothing is combined with a type and color of an accessory to be carried, an evaluation of this combination is performed based on the stored plurality of evaluation data, and the resulting evaluation is displayed on the display. The plurality of evaluation data stored in the memory may be represented in terms of an image which is derived from the designated combination, and the image may be expressed in terms of a plurality of scaled image items. Still further, an evaluation may be performed with respect to a degree of image achieved by a designated combination.

6 Claims, 22 Drawing Sheets

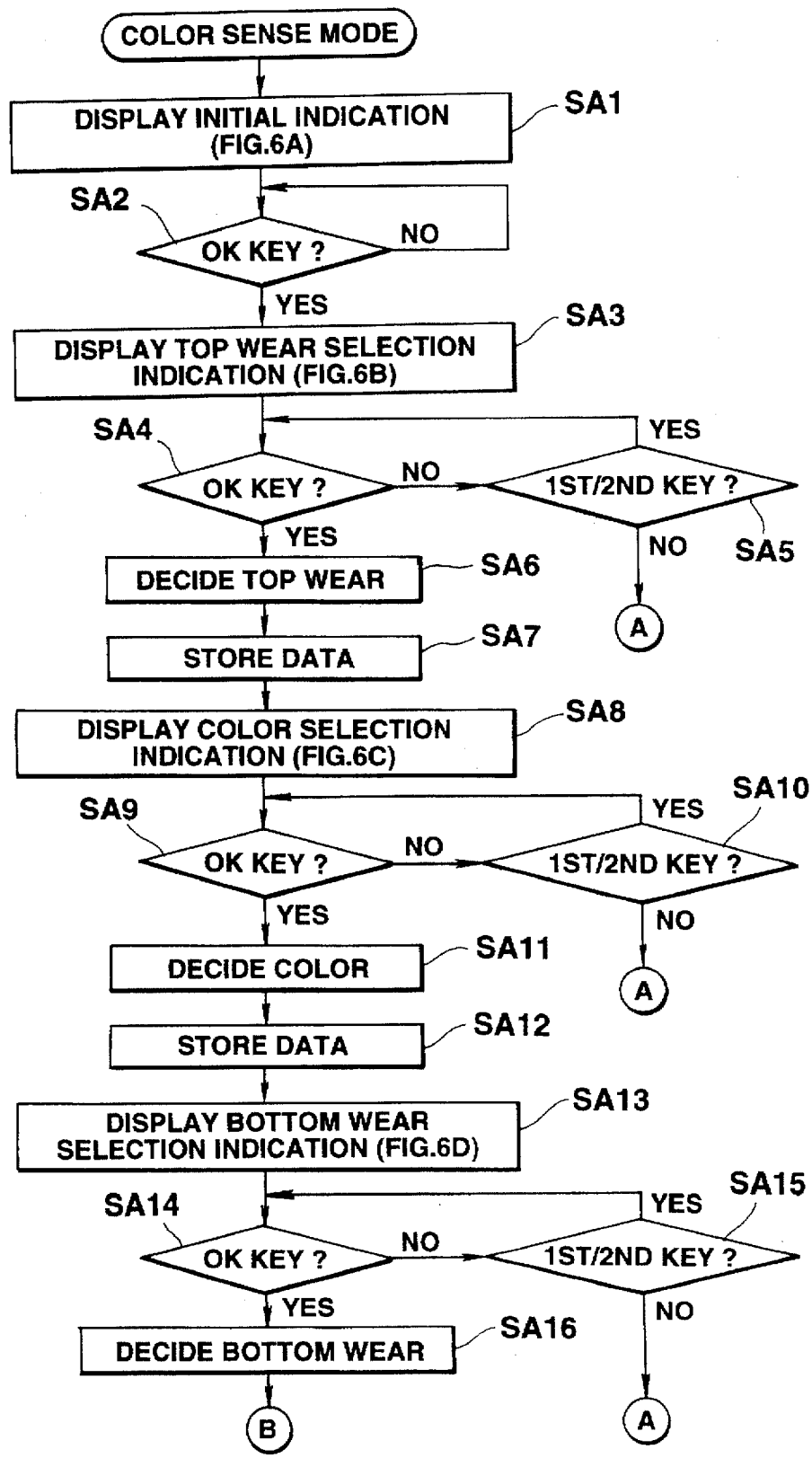

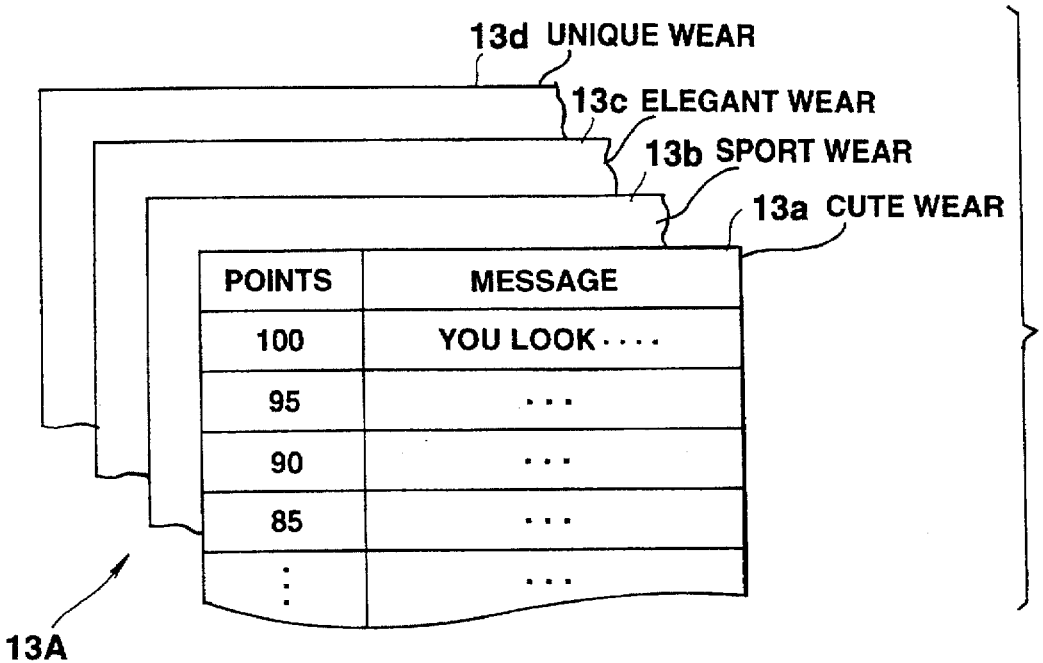

FIG. 17A ☐1 (CUTE)

```
1. CUTE      3. ELEGANT
2. SPORTY    4. UNIQUE
```

FIG. 17B ☐1 (BLOUSE)

```
           (CUTE)
TOP WEAR STYLE ?
  1. BLOUSE    3. SWEATER
  2. T-SHIRT   4. CUT SEW
```

FIG. 17C ☐3 (MINI SKIRT)

```
            (CUTE)
BOTTOM WEAR STYLE ?
1. CULOTTES    3. MINI SKIRT
   SKIRT
2. LONG SKIRT  4. PANTS
```

FIG. 17D ☐3 (PINK)

```
          (CUTE)
TOP WEAR COLOR ?
  1. RED     3. PINK
  2. BLUE    4. ORANGE
```

FIG. 17E ☐4 (ORANGE)

```
           (CUTE)
BOTTOM WEAR COLOR ?
  1. RED     3. PINK
  2. BLUE    4. ORANGE
```

FIG. 17F [EXECUTION]

```
       ∴ CUTE ∴
  75        YOU LOOK
              CUTE !
```

FIG. 17G

```
NAME ?
```

FIG. 17H Ⓐ Ⓚ Ⓔ Ⓜ Ⓘ [EXECUTION]

```
AKEMI
```

FIG. 17I Ⓜ Ⓘ Ⓚ Ⓐ [EXECUTION]

```
MIKA
```

FIG.19A [SEARCH] [EXECUTION]

```
YOUR DATA ?
   AKEMI
```

FIG.19B [SEARCH] [EXECUTION]

```
PARTNER'S DATA ?
   MIKA
```

```
   ♣♣ CUTE ♣♣
       ♥ MIKA ♥
 85   YOU LOOK
        CUTE !
```

FIG.20A (BLOUSE)

```
TOP WEAR STYLE ?
 1. BLOUSE    3. SWEATER
 2. T-SHIRT   4. CUT SEW
```

FIG.20B (MINI SKIRT)

```
BOTTOM WEAR STYLE ?
 1. CULOTTES  3. MINI SKIRT
    SKIRT     4. PANTS
 2. LONG SKIRT
```

FIG.20C (PINK)

```
TOP WEAR COLOR ?
 1. RED     3. PINK
 2. BLUE    4. ORANGE
```

FIG.20D (ORANGE)

```
BOTTOM WEAR COLOR ?
 1. RED     3. PINK
 2. BLUE    4. ORANGE
```

FIG.20E (CUTE)

```
 1. CUTE     3. ELEGANT
 2. SPORTY   4. UNIQUE
```

FIG.20F [EXECUTION]

```
        ♣ CUTE ♣
  75         YOU LOOK
             CUTE !
```

FIG.20G

```
NAME ?
```

FIG.20H Ⓐ Ⓚ Ⓔ Ⓜ Ⓘ [EXECUTION]

```
AKEMI
```

FIG.20I Ⓜ Ⓘ Ⓚ Ⓐ [EXECUTION]

```
MIKA
```

DISPLAY APPARATUS WHICH IS CAPABLE OF DISPLAYING EVALUATION DATA WITH RESPECT TO COLORS

BACKGROUND OF THE INVENTION

1. Field of the Invention

The present invention relates to a display apparatus which is capable of displaying evaluation data with respect to a color designated by a user.

2. Description of the Related Art

Color-data display devices have recently been proposed which display an evaluation or advice on a combination of plural colors that a user designates. When colors to be combined with each other are designated by the user, the color-data display device displays an evaluation or advice on the combination of the designated colors based on a feeling or impression derived from such color combination. For example, the user can confirm evaluation or advice on the color-data displaying device with respect to an impression or image derived from a combination of the colors. Therefore, the user can determine the colors of articles to be worn for going out with reference to the evaluation or advice displayed on the color-data display device.

The conventional color-data display device, however, displays simply on evaluation or advice on a combination of colors. Therefore, the user can not confirm from the conventional color-data display device what impression or image is derived from colors of a pair of goods or whether such combination of colors is proper. Further, even referring to evaluation or advice given by the conventional color-data displaying device, the user can not determine whether the image or impression derived from the combination of colors of a top and bottom articles of clothing meet with an image or impression the user privately has in mind.

SUMMARY OF THE INVENTION

The present invention has been made to overcome the above prior art drawbacks, and has an object to provide a display apparatus, with which a user can learn instantly and without failure what impression is derived from a combination of a pair of goods and colors and whether the combination of the goods and colors is appropriate.

A further object of the present invention is to provide a display apparatus, with which the user can learn promptly whether the impression derived from the combination of the goods and colors meets an image or impression that the user previously has in mind.

According to one aspect of the invention, there is provided a display apparatus which comprises:

display means for displaying data;

evaluation data memory means in which evaluation data are stored, the evaluation data each corresponding to a combination of an article among articles of a first sort and a color of the article of the first sort and an article among articles of a second sort and a color of the article of the second sort;

first designating means for designating one of the articles of the first sort and a color thereof;

second designating means for designating one of the articles of the second sort and a color thereof; and display control means for reading out from said evaluation data memory means evaluation data corresponding to a combination of the article of the first sort and the color thereof both designated by said first designating means and the article of the second sort and the color thereof both designated by said second designating means, and for controlling said display means to display the read out evaluation data.

With the display apparatus having the above structure, when a user designates an article of the first sort and a color thereof with the first designating means and an article of the second sort and a color thereof with the second designating means, evaluation data on a combination of the designated articles of the first and second sorts and colors thereof is read out from the evaluation data memory means and the read out evaluation data is displayed on the display means. As a result, the user can learn whether the combination of articles and colors designated by the user are appropriate one.

According to another aspect of the invention, there is provided a display apparatus which comprises:

first designating means for designating one of plural images;

second designating means for designating one of plural articles;

memory means in which evaluation data are stored, the evaluation data each representing to what degree an article meets an image;

reading means for reading out from said memory means evaluation data which represents to what degree an article designated by said second designating means meet an image designated by said first designating means; and display means for displaying the evaluation data read out by said reading means.

With the display apparatus having the above structure, when the user designates an image among plural images with the first designating means and an article and a color thereof with the second designating means, evaluation data representing to what degree a combination of the designated article and color meets the designated image is read out from the evaluation data memory means and the read out evaluation data is displayed on the display means. As a result, the user can learn to what degree the combination of article and color designated by the user meet the image that the user has in mind.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIG. 5A is a (first half) flowchart of operation of the first embodiment;

FIG. 13 is a view conceptually showing value converting tables stored in a ROM;

FIG. 14 is a view showing a part of RAM;

FIGS. 17A–17I are views showing by way of example indications displayed on a display unit in the input/register process;

FIGS. 19A–19D are views showing by way of example indications displayed on a display unit in the compare/display process; and FIGS. 20A–20I are views showing by way of example indications displayed on a display unit in a fourth embodiment.

DETAILED DESCRIPTION OF PREFERRED EMBODIMENTS

Now, preferred embodiments of the present invention will be described in detail with reference to the accompanying drawings.

First Embodiment

Figure 1:
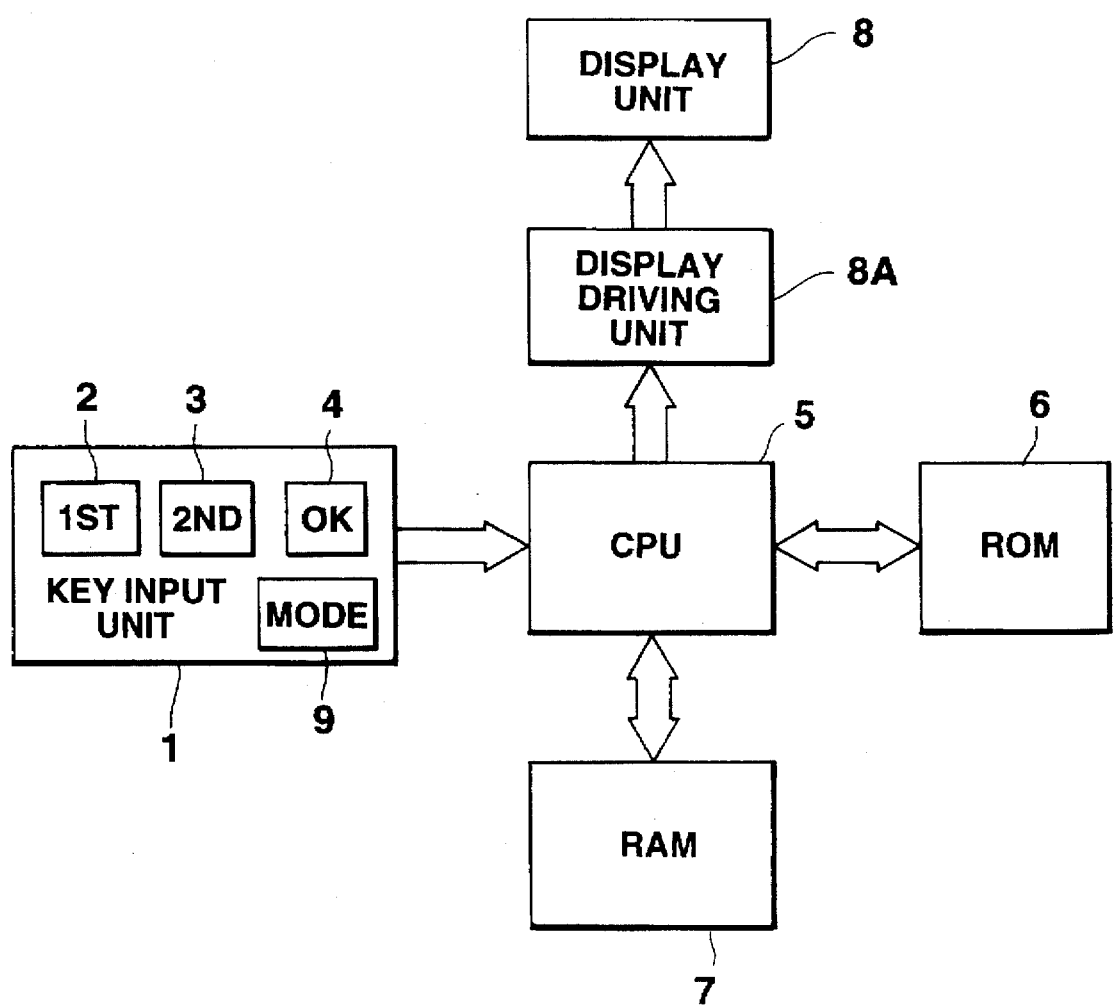
FIG. 1 is a block diagram of a first embodiment of a display apparatus according to the present invention.

A first embodiment of a display apparatus according to the present invention will be described with reference to FIG. 1 to FIG. 6I. FIG. 1 is a circuit diagram of the first embodiment of the display apparatus. A key input unit 1 is provided with a first cursor key 2, a second cursor key 3, an OK key 4 and a mode key 9. Operation signals of these keys are supplied to a central processing unit (CPU) 5. The CPU 5 controls operation of the display apparatus including a display driving unit 8A and a display unit 8 in accordance with the operation signals of the keys, a program data stored in a read only memory (ROM) 6 and data stored in a random access memory (RAM) 7.

Figure 2:
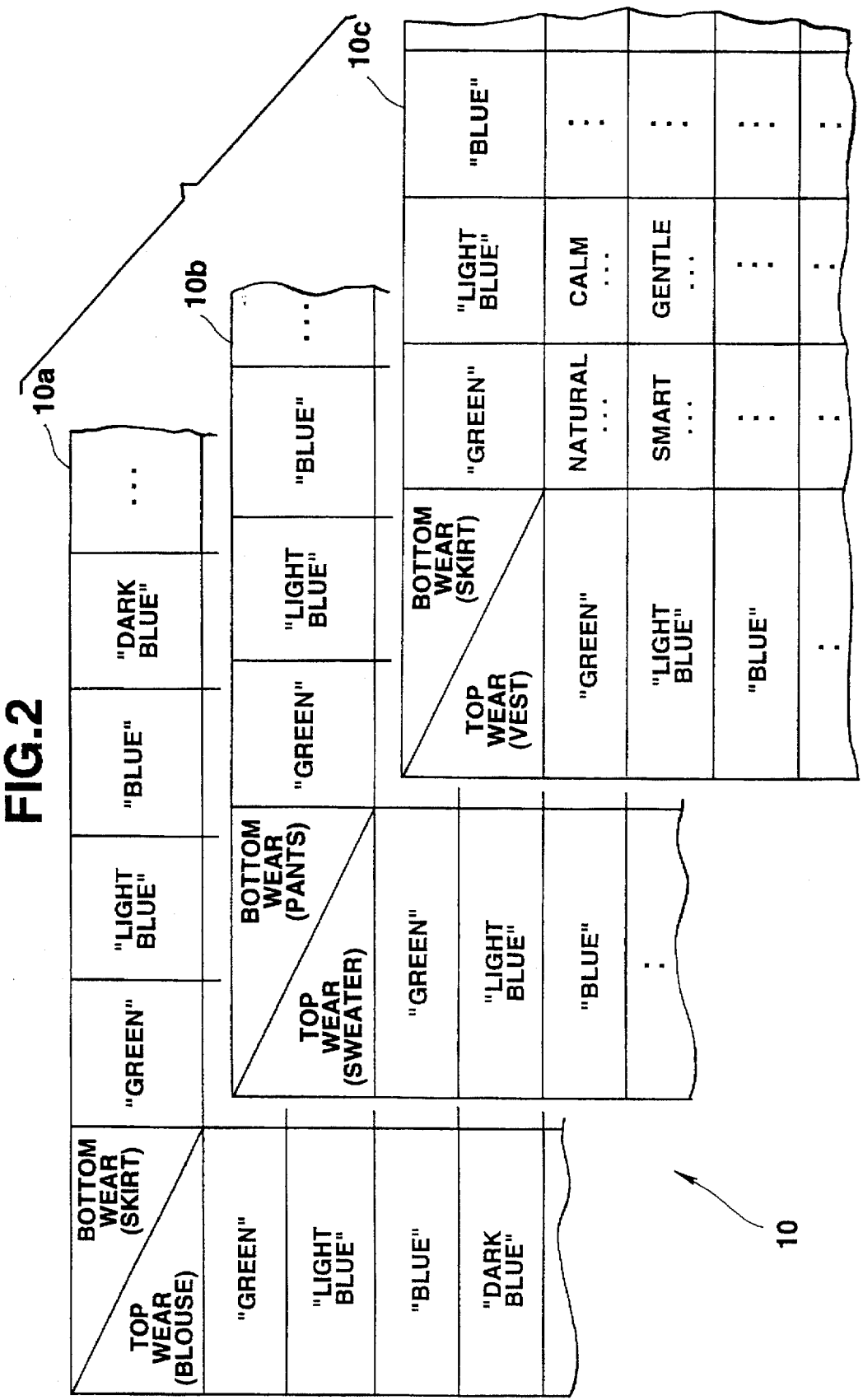
FIG. 2 is a view conceptually showing evaluation/ message converting tables stored in a ROM.
Figure 3:
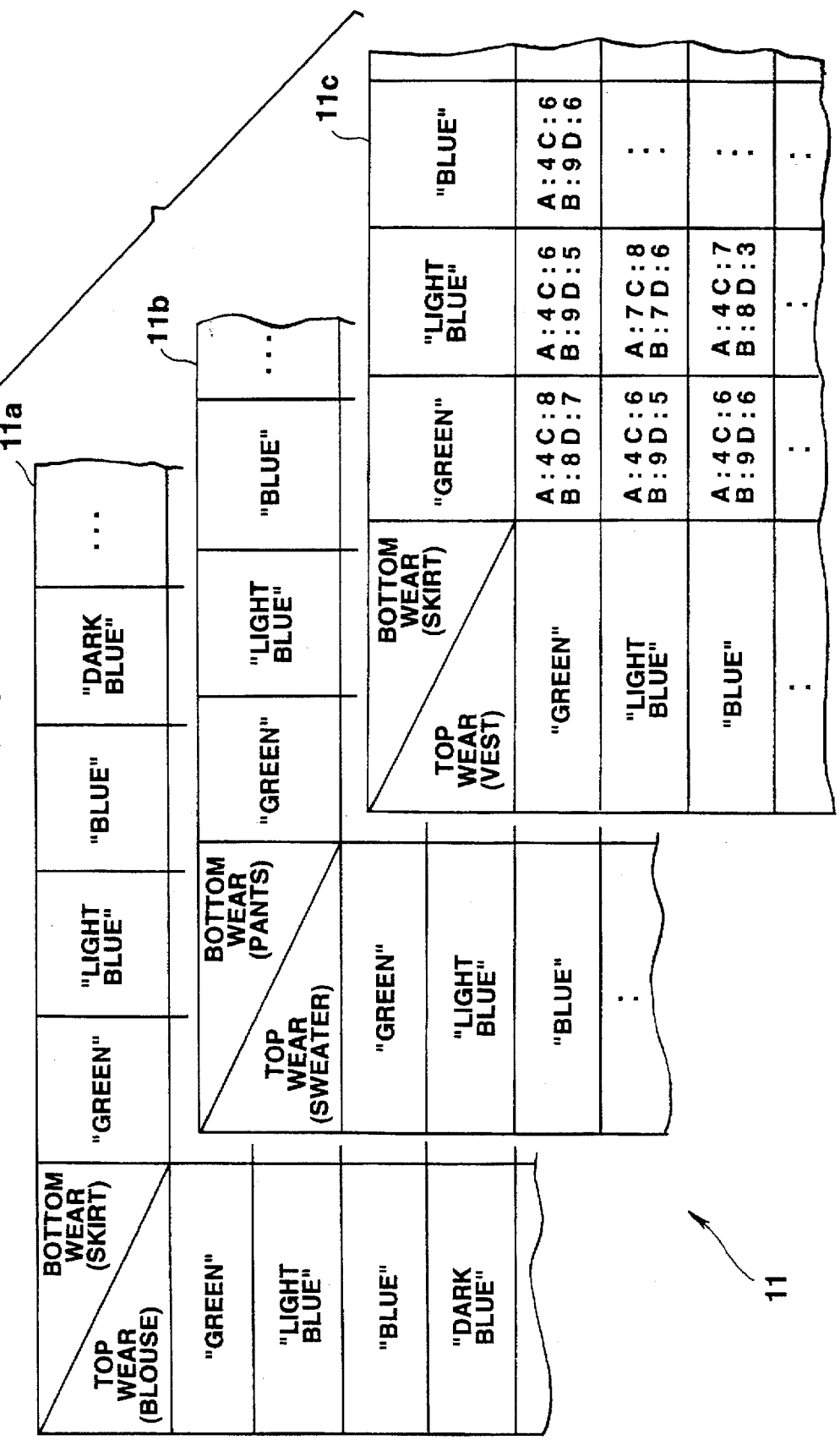
FIG. 3 is a view conceptually showing evaluation value converting tables stored in a ROM.

Stored in the ROM 6 are program data together with an evaluation message converting table 10 of FIG. 2 and an evaluation value converting table 11. The evaluation message converting table 10 comprises plural top/bottom wear tables such as a blouse/skirt table 10a, a sweater/pants table 10b, a vest/skirt table 10c and so on.

These tables are expressed in matrix representation. In these tables of matrix representation, "colors" of clothing for the upper half of the body (such as a blouse, sweater, T-shirt and so on, hereafter, referred to as "top wear") such as "green", "light blue", "blue", "dark blue" and so on are written in the first column and, similarly, "colors" for clothing for the lower half of the body (such as skirt, pants, and so on, hereafter, referred to as "bottom wear") are written in the top row. Image data representative of an image derived from a combination of a color in the i-th row and a color in the j-th column in the matrix representation is written in a cell at a crossing of the i-th row and the j-th column. Image data represent, for example, an image giving a feeling of "calm and gentle color coordination making others at ease" and so on.

Similarly, the evaluation value converting table 11 comprises plural top/bottom wear combination tables such as a blouse/skirt table 11a, a sweater/pants table 11b, a vest/skirt table 11c and so on, which are expressed in matrix representation. In these tables of matrix representation colors of top wear such as "green", "light blue", "blue", "dark blue" and so on are written in the first column and, similarly, colors for bottom wear are written in the top row. Evaluation of a combination of colors in the i-th row and the j-th column in the matrix representation is expressed in terms of four images: A, B, C and D, and is written in the cell at the crossing of the i-th row and the j-th column. The images: A, B, C and D represent "cuteness", "sportiness", "elegance" and "personality", respectively, and ten point evaluation data (1 to 10) are given to the images A, B, C and D. The cells in the blouse/skirt table 11a, the sweater/pants table 11b, the vest/skirt table 11c and so on correspond respectively to cells in the blouse/skirt table 10a, the sweater/pants table 10b, the vest/skirt table 10c and so on, respectively.

Figure 4:
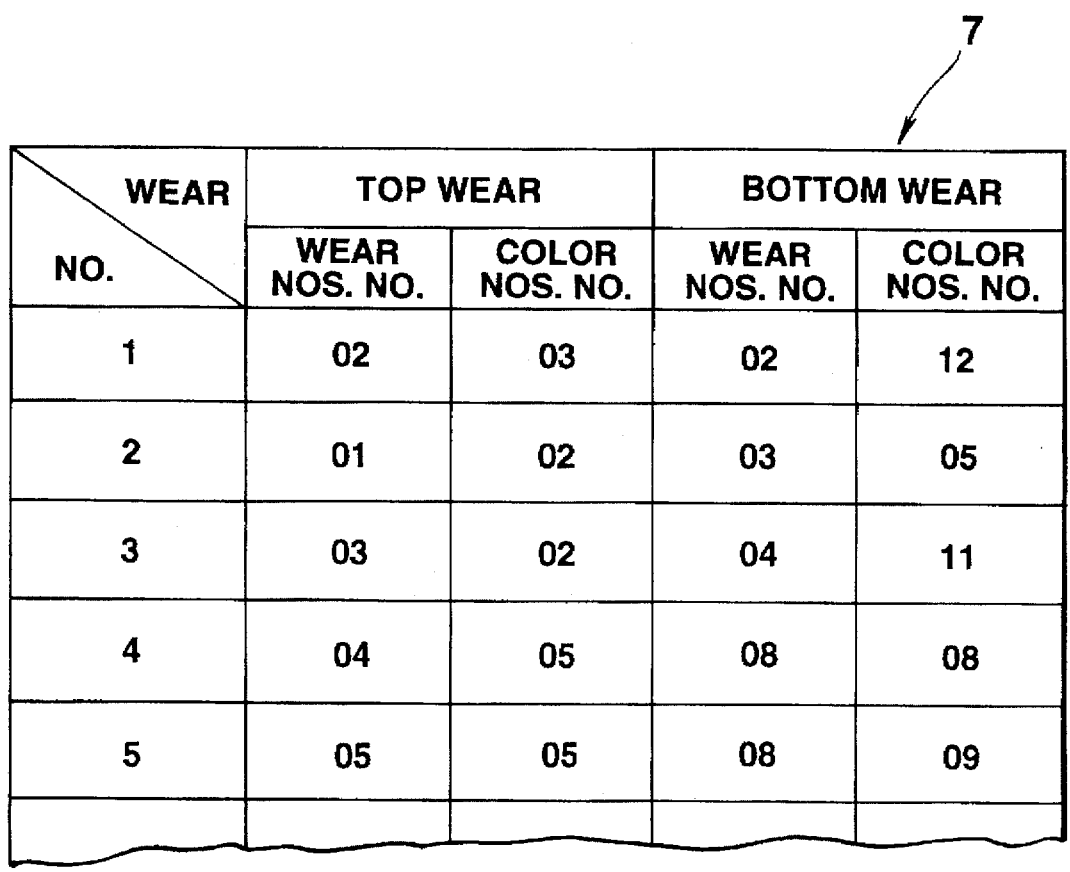
FIG. 4 is a view showing by way of example data stored in a RAM.

As shown in FIG. 4, the RAM 7 is used to stored data of the top and bottom wear and their colors selected by a user.

Figure 5B:
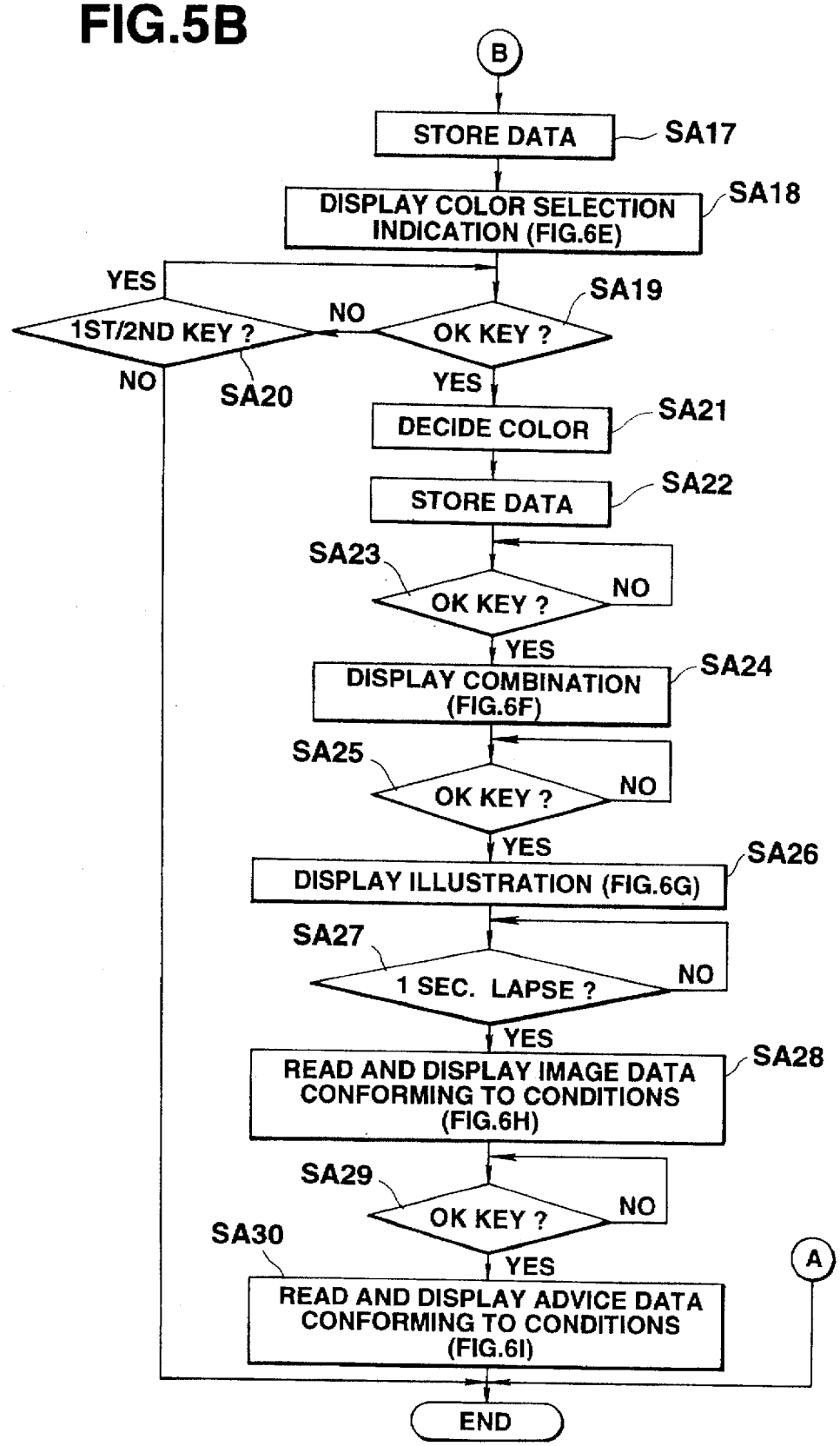
FIG. 5B is a (second half) flowchart of operation of the first embodiment, which flowchart is to be connected to the flowchart of FIG. 5A.
Figure 6A:
FIGS. 6A–6I are views showing by way of example indications displayed on a display unit in the first embodiment.

Now, the embodiment of the display apparatus according to the present invention will be described with reference to flowcharts of FIGS. 5A and 5B. When a color sense mode is set by operation of the mode key 9, the CPU 5 starts its operation in accordance with the flowchart of FIG. 5A, and performs an initial indication displaying process. At step SA1, an initial indication is displayed on a display unit 8, as shown in FIG. 6A. Then, it is judged at step SA2 whether the OK key 4 is operated. When it is determined that the OK key 4 is operated (when YES), a displaying process is executed at step SA3 to display an indication for selecting top wear. In the displaying process at step SA3, a message "TOP WEAR?", together with "01:BLOUSE", "02:SWEATER", "03:VEST" and so on are displayed on the display unit 8. The top wear, "BLOUSE", "SWEATER", "VEST" and so on are stored in the converting tables 10 and 11. Numerals, "01", "02", "03" and so on are selection numbers, which are designated to choose corresponding top wear. Further, a cursor 14 is displayed on one of the selection numbers in an overlapping manner.

It is judged at step SA4 whether the OK key 4 is operated. When the OK key 4 is not operated (when NO), it is judged at step SA5 whether the first cursor key 2 or the second cursor key 3 is operated. When either the first cursor key 2 or the second cursor key 3 is operated, the operation returns to step SA4. At this time, the cursor 14 is moved responsive to operation of the first cursor key 2 or the second cursor key 3. The cursor 14 moves vertically on the selection numerals responsive to operation of the first cursor key 2 or the second cursor key 3. The user of the display apparatus can select top wear by operating the OK key 4 when the cursor 14 comes on the selection numeral corresponding to the top wear that the user wants to select.

Figure 6B:
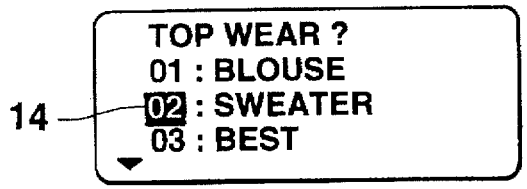

When the OK key 4 is operated, the operation goes from step SA4 to step SA6, where top wear is chosen, and data designating the chosen top wear is stored in a predetermined memory area of the RAM 7 at step SA7. When, for example, the cursor 14 is moved onto the selection number "02" of "sweater", as shown in FIG. 6B, and the OK key 4 is operated, the selection number "02" representative of "sweater" is stored at a corresponding area in the RAM 7 (at a raw of NO. 1 in a column of a wear Nos. of Top wear) at step SA7.

Figure 6C:
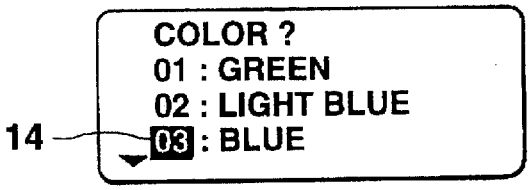

A displaying process is executed at step SA8 to display an indication for choosing a color of top wear. In the display process at step SA8, a message "COLOR OF TOP WEAR?" together with "01:GREEN", "02:LIGHT BLUE", "03:BLUE" stored in both the converting tables 10 and 11 are displayed on the display unit 8 as shown in FIG. 6C. The cursor 14 is also displayed on one of the selection numbers in an overlapping manner.

It is judged at step SA9 whether the OK key 4 is operated. When NO, it is judged at step SA10 whether the first cursor key 2 or the second cursor key 3 is operated. When either the first cursor key 2 or the second cursor key 3 is operated, the operation returns to step SA9, where the cursor 14 moves responsive to operation of the first cursor key 2 or the second cursor key 3. When the cursor 14 comes on the selection number of a desired color of the chosen top wear, the OK key 4 is operated to select the desired color of the top wear.

Since it is determined at step SA9 that the OK key 4 is operated, the operation goes from step SA9 to step SA11, where the desired dress color is decided, and data representative of the decided color of the top wear is stored in a predetermined memory area of the RAM 7 at step SA12. For example, as shown in FIG. 6C, the cursor 14 is moved onto the selection number "03" of "BLUE", and the OK key 4 is operated. Then, the selection number "03" i.e., data representative of "BLUE" is stored at the predetermined memory area (at a top raw in a color No. column of top wear) in the RAM 7.

Figure 6D:

At step SA13, a displaying process is executed to display an indication for choosing bottom wear. In the display process at step SA13, a message "BOTTOM WEAR?" together with "01:SKIRT", "02:PANTS" stored in both the converting tables 10, 11 are displayed on the display unit 8, as shown in FIG. 6D. And also the cursor 14 is displayed on one of the selection numbers in an overlapping manner.

It is judged at step SA14 whether the OK key 4 is operated. When NO, it is judged at step SA15 whether the first cursor key 2 or the second cursor key 3 is operated. When the first cursor key 2 or the second cursor key 3 is operated, the operation returns to step SA14, where the cursor 14 moves responsive to operation of the first cursor key 2 or the second cursor key 3. When the cursor 14 comes on the selection number of the bottom wear that the user wants to wear, the OK key 4 is operated to select the desired bottom wear.

Since it is determined at step SA14 that the OK key 4 is operated, the operation goes from step SA14 to step SA16, where the desired bottom wear is chosen, and data representative of the chosen bottom wear is stored in a predetermined memory area of the RAM 7 at step SA17 of FIG. 5. For example, as shown in FIG. 6D, the cursor 14 is moved to the selection number "02" of "PANTS", and the OK key 4 is operated. Then, the selection number "02", i.e., data representative of "PANTS" is stored in the predetermined memory area (in a column of bottom wear Nos.) of the RAM 7.

Figure 6E:
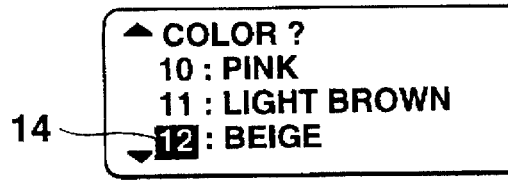

Further, a displaying process is executed at step SA18 to display an indication for choosing a color of bottom wear. In the display process at step SA18, a message "BOTTOM WEAR COLOR?" together with "10:PINK", "11:LIGHT BROWN", "12:BEIGE" stored in both the converting tables 10, 11 are displayed on the display unit 8, as shown in FIG. 6E. Similarly, the cursor 14 is displayed on one of the selection numbers in an overlapping manner.

It is judged at step SA19 whether the OK key 4 is operated. When NO, it is judged at SA20 whether the first cursor key 2 or the second cursor key 3 is operated. When the first cursor key 2 or the second cursor key 3 is operated, the operation returns to step SA19, where the cursor 14 moves responsive to operation of the first cursor key 2 or the second cursor key 3. When the cursor 14 comes on the selection number of a desired color of the chosen bottom wear, the OK key 4 is operated to select the desired bottom wear color.

Since it is determined at step SA19 that the OK key 4 is operated, the operation goes from step SA19 to step SA21, where the desired bottom wear color is decided, and data representative of the decided bottom wear color is stored in a predetermined memory area of the RAM 7 at step SA22. For example, as shown in FIG. 6E, the cursor 14 is moved to the selection number "12" of "BEIGE", and the OK key 4 is operated. Then, the selection number "12", i.e., data representative of "BEIGE" is stored in the predetermined memory area (at a top raw in a column of bottom wear color of FIG. 4) of the RAM 7.

Figure 6F:

Similarly, at step SA23, it is judged whether the OK key 4 is operated. When YES, a displaying process is performed to display an indication for confirming a combination of the chosen wear and colors. In the displaying process at step SA23, a message "COMBINATION OK?" and chosen wear and colors, i.e., "02:SWEATER", "03:BLUE", "02:PANTS" and "12:BEIGE" are displayed as shown in FIG. 6F.

Figure 6G:

Then, it is judged at step SA25 whether the OK key 4 is operated. When YES, an illustration is displayed on the display unit 8 for about one second at step SA26 as shown in FIG. 6G. When it is determined at step SA27 that one second lapsed, the operation goes from step SA27 to step SA28, where image data confirming with designated condition is read out from the evaluation converting table 11 and is displayed on the display unit 8.

Figure 6H:
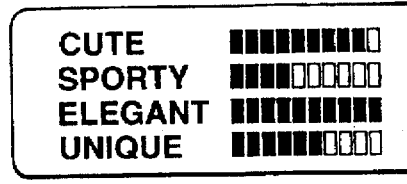

For instance, since the "SWEATER" and "PANTS" are chosen for the top and bottom wear, the sweater/pants table 11*b* (FIG. 3) of the evaluation value converting table 11 is used. A color "BLUE" is designated for the sweater and a color "BEIGE" is designated for the pants. As a result, evaluations with respect to A:CUTENESS, B:SPORTINESS, C:ELEGANCE, and D:PERSONALITY in the cell at the crossing of the BLUE row and the BEIGE column are read out and evaluations with respect to A:CUTENESS, B:SPORTINESS, C:ELEGANCE, and D:PERSONALITY are displayed on the display unit 8 with bars each having a length representing the read out evaluations as shown in FIG. 6H.

At step SA29, it is judged whether the OK key 4 is operated. When YES, the image data conforming with the designated condition is read out from the evaluation message converting table 10, and is displayed on the display unit B. For instance, since the sweater and the pants are chosen as top and bottom wear, the sweater/pants table 10b (FIG. 2) of the evaluation message converting table 10 is used. Since a color "BLUE" is chosen for the sweater and a color "BEIGE" is chosen for the pants, an evaluation is read out from the cell at the crossing of the BLUE row and the BEIGE column of the sweater/pants table 10b, and is displayed on the display unit 8. As a result, a message "COLOR COORDINATION OF CALM AND GENTLE IMAGE MAKING OTHERS AT EASE" is displayed on the display unit 8.

In the first embodiment of the display apparatus, the top wear is chosen as first goods and the bottom wear is chosen as second goods. Alternatively, clothing may be chosen as first goods and a thing to be carried for going out such as a bag and a rucksack may be chosen as second goods as in the following embodiment.

Second Embodiment

Now, a second embodiment of the display apparatus according to the present invention will be described with reference to FIGS. 7–10H. The second embodiment has the similar structure to the first embodiment except data in the ROM 6.

Figure 7:
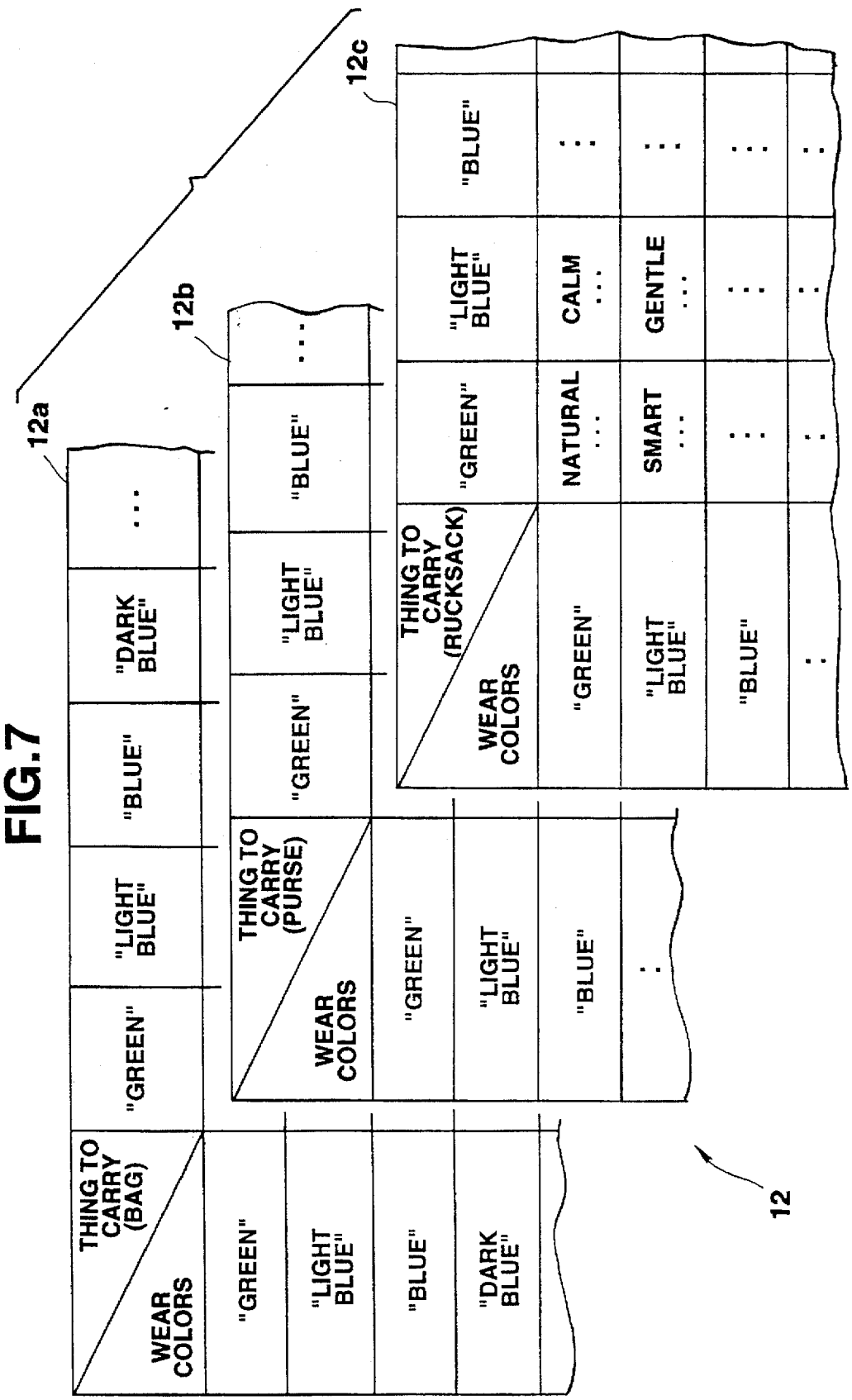
FIG. 7 is a view conceptually showing evaluation/message converting tables stored in a ROM of a second embodiment of the display apparatus according to the present invention.
Figure 8:
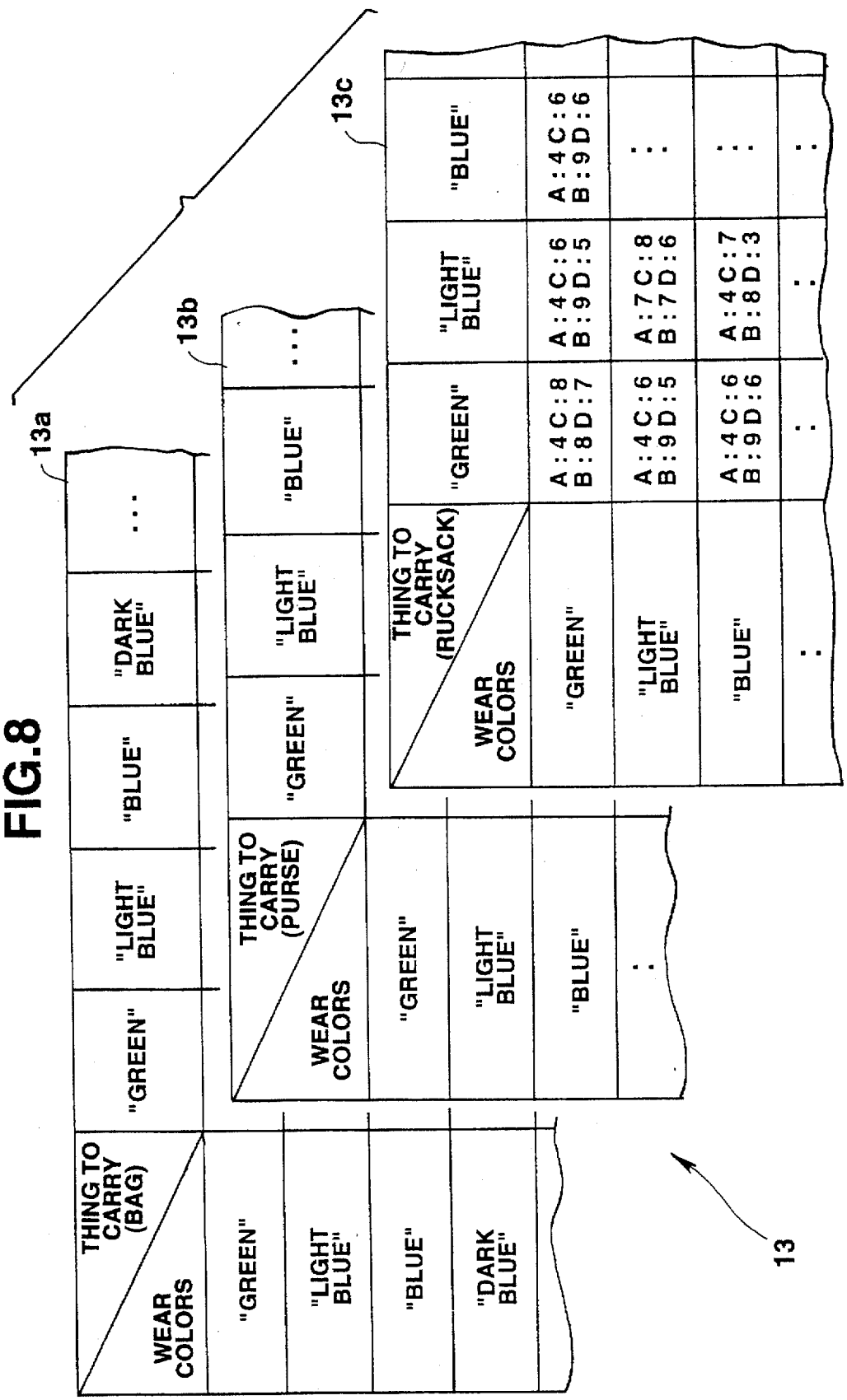
FIG. 8 is a view conceptually showing evaluation value converting tables stored in a ROM of the second embodiment.

Stored in the ROM 6 of the second embodiment are store the program together with an evaluation message converting table 12 and an evaluation value converting table 13. The evaluation message converting table 12 and the evaluation value converting table 13 are schematically shown in FIGS. 7 and 8 respectively. The evaluation message converting table 12 of FIG. 7 comprises plural tables such as a bag table 12a, a purse table 12b, a rucksack table 12c and so on. These tables are expressed in matrix presentation. In these tables of matrix presentation, colors of clothing such as "GREEN", "LIGHT BLUE", "BLUE", "DARK BLUE" and so on are written in the first column and, similarly, colors of things to carry are written in the first row. Further, image data representative of an image derived from a combination of colors in the first row and the first column in the matrix representation is written in the cell at the crossing of the row and the column of the colors to be combined.

Similarly, the evaluation value converting table 13 comprises plural tables such as a bag table 13a, a purse table 13b, a rucksack table 13c and so on. The tables 13a to 13c are expressed in matrix representation, in which evaluation data on combinations of colors, more specifically, evaluation data on combinations of colors in the first row and colors in the first column in the matrix representation are made in terms of four evaluation items: A, B, C and D, and are expressed in 10 steps. The evaluation is made in terms of four items: "A:CUTENESS", "B:SPORTINESS", "C:ELEGANCE" and "D:PERSONALITY".

Figure 9A:
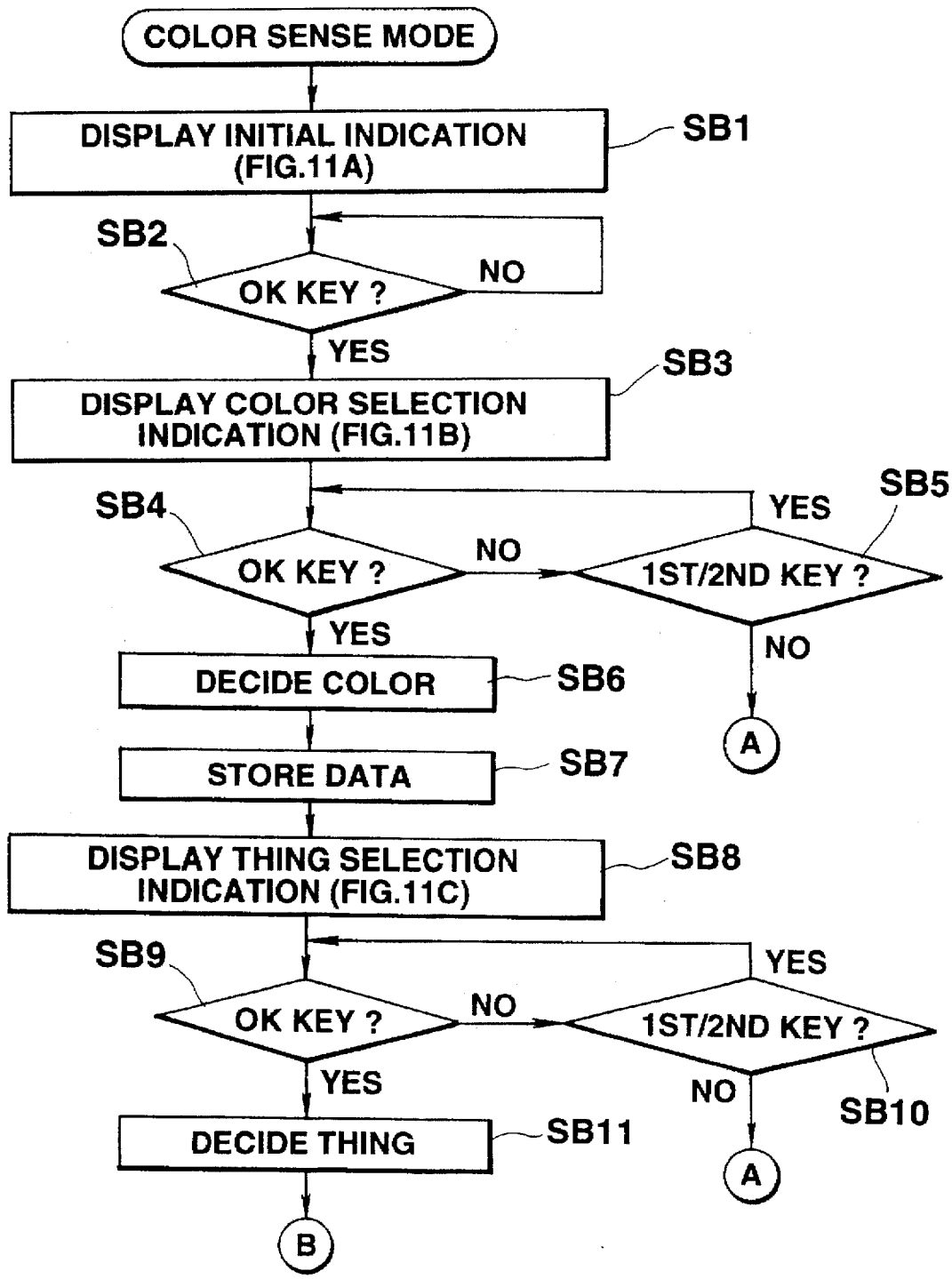
FIG. 9A is a (first half) flowchart of operation of the second embodiment.
Figure 9B:
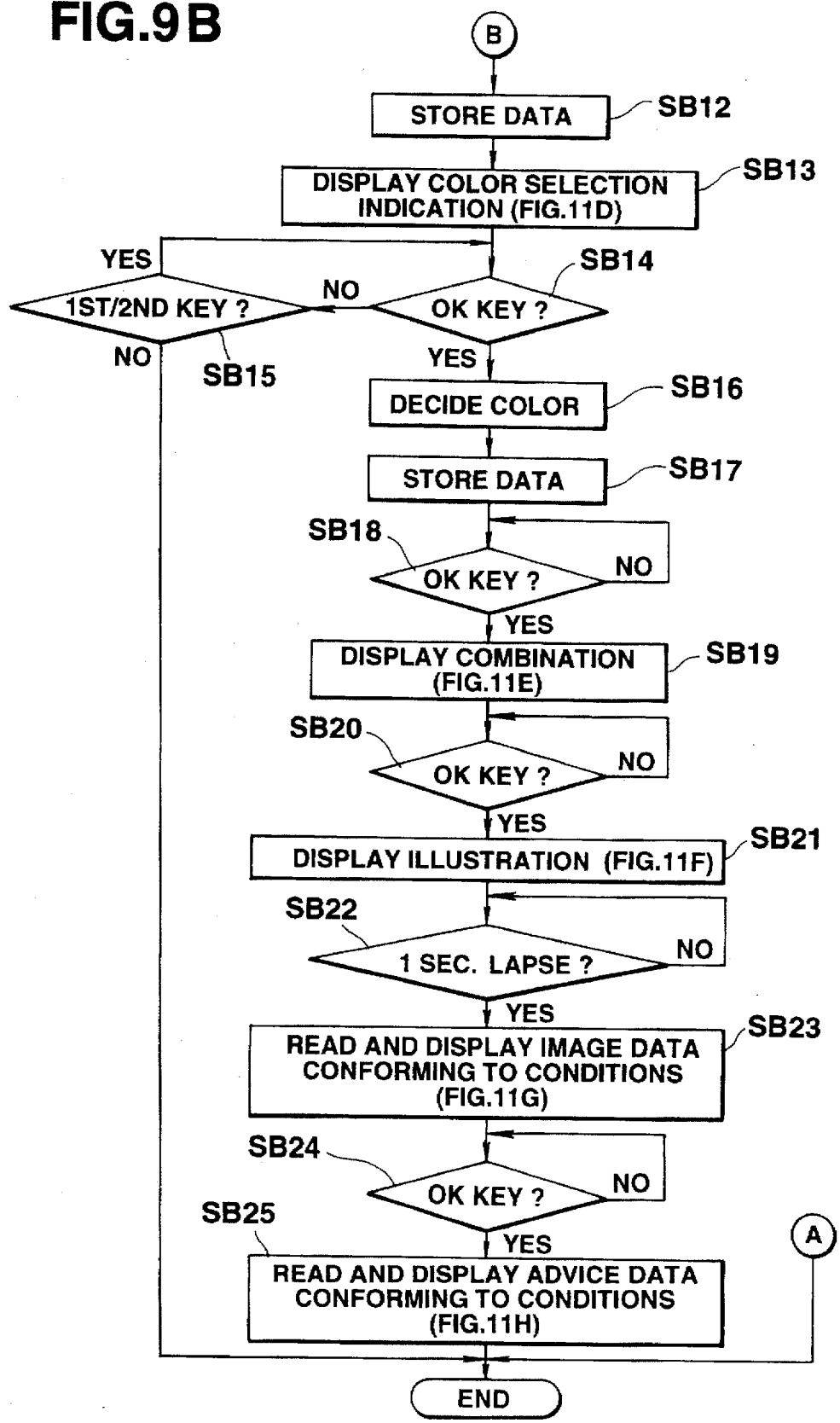
FIG. 9B is a (second half) flowchart of operation of the second embodiment, which flowchart is to be connected to the flowchart of FIG. 9A.

Operation of the second embodiment of the display apparatus with the above structure will be described with reference to FIGS. 9A and 9B. When a color sense mode is set by operation of the mode key 9, the CPU 5 will operate in accordance with a flowchart of FIG. 9A. At step SB1 of FIG. 9A, a displaying process is performed to display an initial indication. In the displaying process at step SB1, an illustration is displayed on the display unit 8 as shown by way of example in FIG. 10A. Then, it is judged at step SB2 whether the OK key 4 is operated. When YES, a displaying process is performed at step SB3 to display an indication for choosing a color. In the display process at step SB3, a message "WEAR COLOR?" together with "01:GREEN", "02:LIGHT BLUE", "03:BLUE" stored in both the converting tables 12 and 13 are displayed on the display unit 8 as shown at (B) in FIG. 10B. The cursor 14 is also displayed on one of the selection numbers in an overlapping manner.

It is judged at step SB4 whether the OK key 4 is operated. When NO, it is judged at step SB5 whether the first cursor key 2 or the second cursor key 3 is operated. When the first cursor key 2 or the second cursor key 3 is operated, the operation returns to step SB4, where the cursor 14 moves responsive to operation of the first cursor key 2 or the second cursor key 3. When the cursor 14 comes on the selection number of a desired top wear color, the OK key 4 is operated to select the desired clothing color.

Figure 10A:
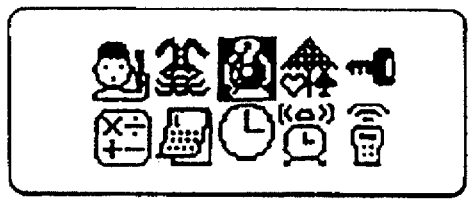
FIGS. 10A–10H are views showing by way of example indications displayed on a display unit in the second embodiment.
Figure 10B:
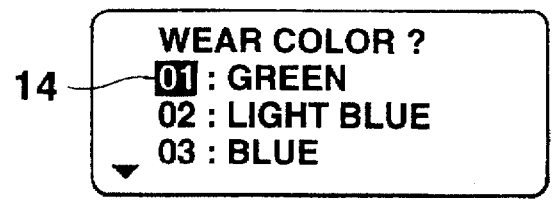

Since it is determined at step SB4 that the OK key 4 is operated, the operation goes from step SB4 to step SB9, where the desired wear color is decided, and data representative of the decided clothing color is stored in a predetermined memory area of the RAM 7 at step SB7. For example, as shown in FIG. 10B, the cursor 14 is moved to the selection number "01" of "GREEN", and the OK key 4 is operated. Then, the selection number "01" i.e., data representative of "GREEN" is stored in the predetermined memory area of the RAM 7.

At step SB8, a displaying process is executed to display an indication for choosing a thing to be carried. In the display process at step SB8, a message "A THING TO CARRY WITH YOU?" together with "01:BAG", "02:PURSE", "03:RUCKSACK" stored in both the converting tables 12, 13 are displayed on the display unit 8. And also the cursor 14 is displayed on one of the selection numbers in an overlapping manner.

It is judged at step SB9 whether the OK key 4 is operated. When NO, it is judged at SB10 whether the first cursor key 2 or the second cursor key 3 is operated. When the first cursor key 2 or the second cursor key 3 is operated, the operation returns to step SB9, where the cursor 14 moves responsive to operation of the first cursor key 2 or the second cursor key 3. When the cursor 14 comes on the selection number of a thing desired to be carried, the OK key 4 is operated to select the desired thing.

Figure 10C:
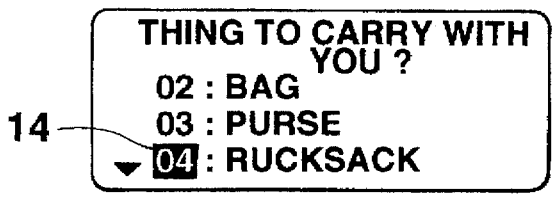

Since it is determined at step SB9 that the OK key 4 is operated, the operation goes from step SB9 to step SB11, where the desired thing to be carried is decided, and data representative of the decided thing is stored in a predetermined memory area of the RAM 7 at step SB12 of FIG. 5. For example, as shown in FIG. 10C, the cursor 14 is moved to the selection number "04" of "RUCKSACK", and the OK key 4 is operated. Then, the selection number "04", i.e., data representative of "RUCKSACK" is stored in the predetermined memory area of the RAM 7.

Further, a displaying process is executed at step SB13 to display an indication for choosing a color. In the display process at step SB13, a message "WHAT COLOR?" together with "10:PINK", "11:LIGHT BROWN", "12:BEIGE" stored in both the converting tables 10, 11 are displayed on the display unit 8. And also the cursor 14 is displayed on one of the selection numbers in an overlapping manner.

It is judged at step SB14 whether the OK key 4 is operated. When NO, it is judged at step SB14 whether the first cursor key 2 or the second cursor key 3 is operated. When the first cursor key 2 or the second cursor key 3 is operated, the operation returns to step SB14, where the cursor 14 moves responsive to operation of the first cursor key 2 or the second cursor key 3. When the cursor 14 comes on the selection number of a desired color, the OK key 4 is operated to select the desired color.

Figure 10D:
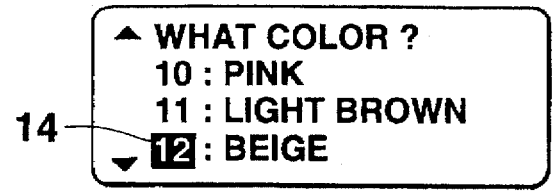

Since it is determined at step SB14 that the OK key 4 is operated, the operation goes from step SB14 to step SB16, where the desired color of the thing to be carried is decided, and data representative of the decided color of the thing is stored in a predetermined memory area of the RAM 7 at step SB17. For example, as shown in FIG. 10D, the cursor 14 is moved to the selection number "12" of "BEIGE", and the OK key 4 is operated. Then, the selection number "12" i.e., data representative of "BEIGE" is stored in the predetermined memory area of the RAM 7.

Figure 10E:
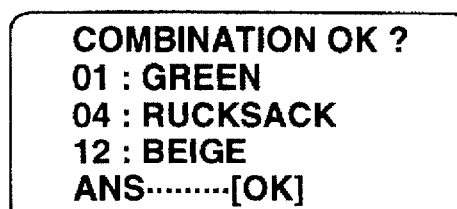

At step SB18, it is judged whether the OK 4 is operated. When YES, a displaying process is performed to display an indication for confirming a combination of the chosen clothing color, the thing to carry with him and the color of the thing. In the displaying process at step SB19, a message "COMBINATION OK?" together with "01:GREEN", "04:RUCKSACK" and "12:BEIGE" are displayed as shown in FIG. 10E.

Figure 10F:
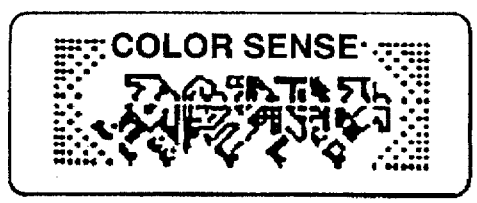

Then, it is judged at step SB20 whether the OK key 4 is operated. When YES, an illustration is displayed on the display unit 8 for one second at steps SB21, SB22 as shown in FIG. 10F. When it is determined at step SB22 that one second lapsed, the operation goes from step SB22 to step SB23, where image data confirming with designated condition is read out from the evaluation value converting table 13 and is displayed on the display unit 8.

Figure 10G:
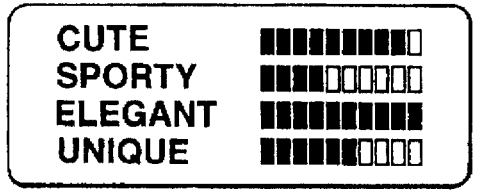

For instance, since the "RUCKSACK" is chosen as a thing to be carried, the rucksack table 13c (FIG. 8) of the evaluation value converting table 13 is used. A color "GREEN" is chosen for the wear and a color "BEIGE" is chosen for the rucksack. As a result, evaluations with respect to A:CUTENESS, B:SPORTINESS, C:ELEGANCE, and D:PERSONALITY in the cell at the crossing of the GREEN row and the BEIGE column are read out and the read out evaluation with respect to A:CUTENESS, B:SPORTINESS, C:ELEGANCE, and D:PERSONALITY are displayed on the display unit 8 with bars each having a length corresponding to the read out corresponding evaluations as shown in FIG. 10G.

Figure 10H:

At step SB24, it is judged whether the OK key 4 is operated. When YES, the image data conforming with the designated condition is read out from the evaluation message converting table 12, and is displayed on the display unit 8. For instance, since the rucksack is chosen as the thing to be carried, the rucksack table 12c (FIG. 7) of the evaluation message converting table 12 is used. Since a color "GREEN" is chosen for the clothing and a color "BEIGE" is chosen for the rucksack, an evaluation is read out from the cell at the crossing of the GREEN row and the BEIGE column of the rucksack table 12b, and is displayed on the display unit 8. As a result, a message "COLOR COORDINATION OF CALM AND GENTLE IMAGE MAKING OTHERS AT EASE" is displayed on the display unit 8 at step SB30, as shown in FIG. 10H.

In the second embodiment of the invention, evaluation is made on a combination of fashionable things such as a blouse, a skirt and a bag. The invention apparatus may also be applied to a combination of a car body, car seats, an interior design and steering wheel to display evaluation on the combination thereof. The combination is not limited to two things, and more than two things may be combined and an evaluation on the combination may be displayed in the invention apparatus.

Figure 6I:

As described above, in the first and second embodiments of the display apparatus, a first thing and its designated color are combined with a second thing and its designated color, and an evaluation of this combination is displayed, as shown in FIGS. 6H and 6I. Further, a color of a first thing selected is combined with a type of a second thing (accessory) to be carried, and an evaluation of this combination is displayed, as shown in FIGS. 10G and 10H. Therefore, for example, the user can promptly get evaluation information concerning top and bottom wear, or clothing and an accessory.

Third Embodiment

Figure 11:
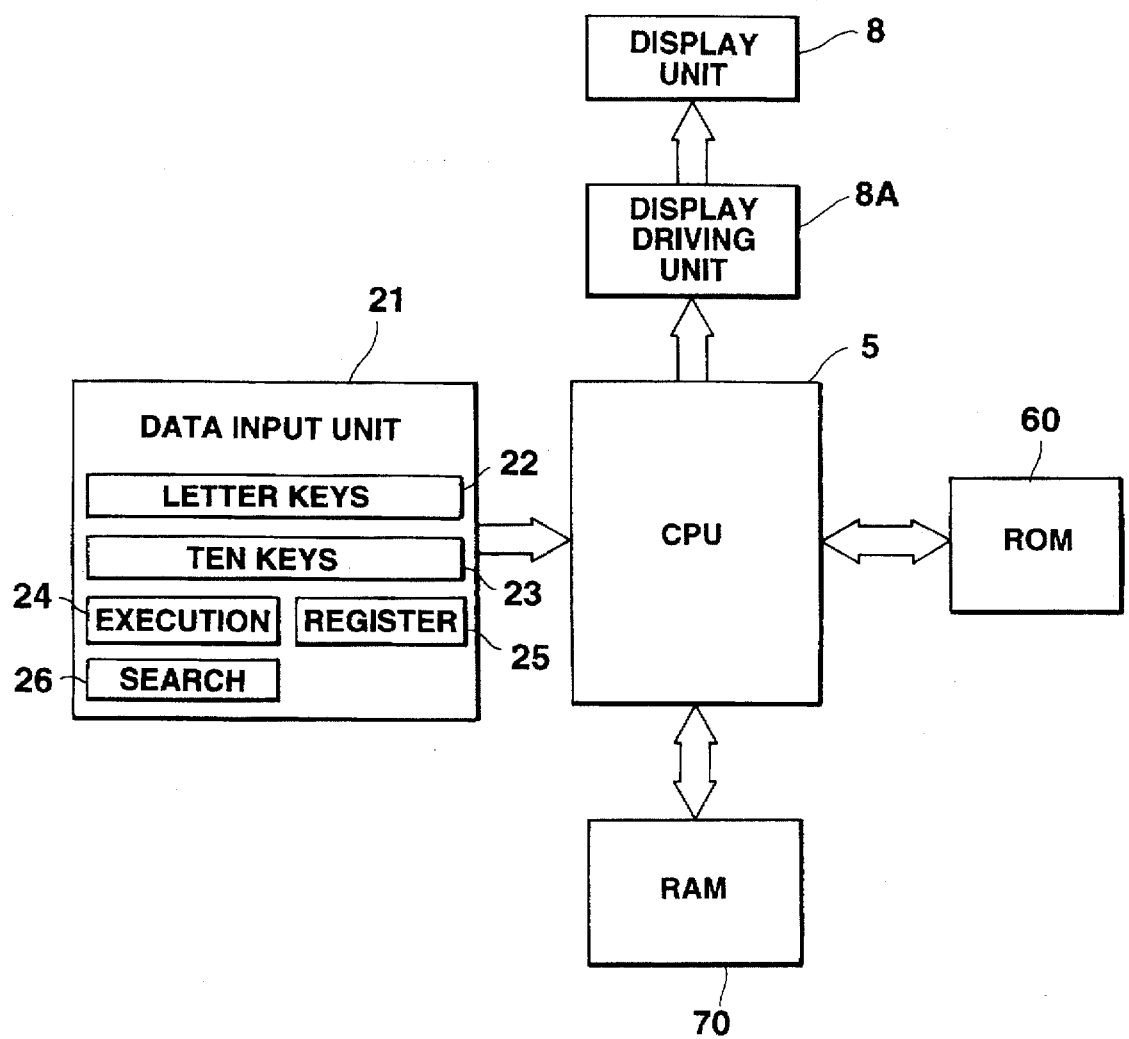
FIG. 11 is a block diagram of a third embodiment of the display apparatus according to the present invention.

Now, a third embodiment of the display apparatus according to the present invention will be described in accordance with FIGS. 11-17I. FIG. 11 is a circuit diagram of the third embodiment of the display apparatus. A data input unit 21 comprises plural letter keys 22, plural ten keys 23, an execution key 24, a register key 25 and a search key 26. Operation signals of these keys are input to a CPU 5. The CPU 5 controls operation of the display apparatus in accordance with operation signals supplied from the data input unit 21, program data stored in ROM 60 and data stored in RAM 70, and further the CPU 5 controls a display driving unit 8A, which drives a display unit 8.

Figure 12:
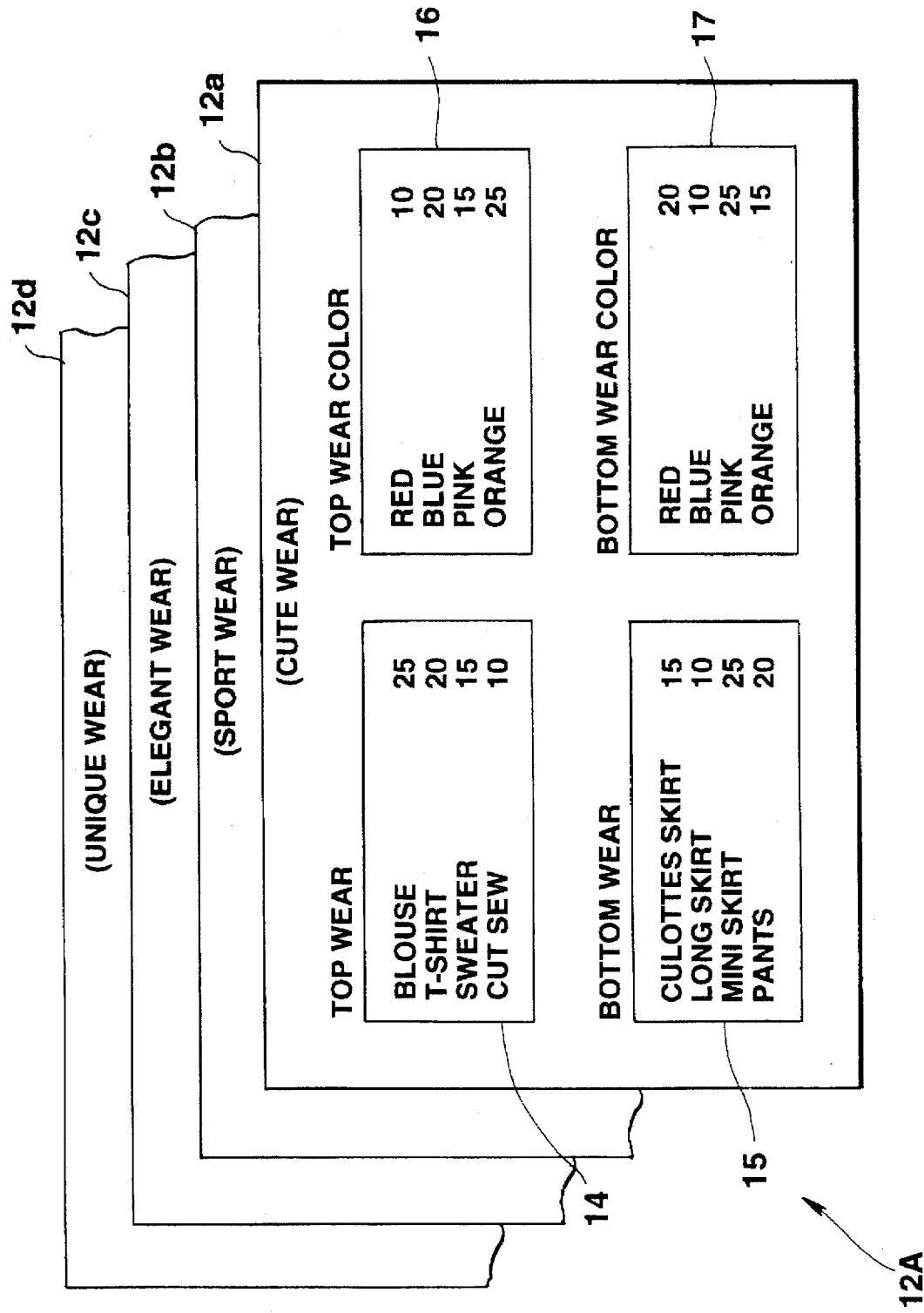
FIG. 12 is a view conceptually showing evaluation value converting tables stored in a ROM.

In the ROM 60 are stored the above program data, an evaluation value converting table 12A schematically shown in FIG. 12 and a point converting table 13A schematically shown in FIG. 13. The evaluation value converting table 12A comprises a cute wear table 12a, a sporty wear table 12b, an elegant wear table 12c and a unique wear table 12d, each of which expresses an image of wear.

Further, each of these tables 12a-12d comprises a top wear table 14, a bottom wear table 15, a top wear color table 16 and a bottom wear color table 17. In the top wear table 14 are memorized four kinds of top wear such as "BLOUSE", "T-SHIRT", "SWEATER" and "CUT SEW", and points allotted respectively to these kinds of top wear. In the bottom wear table 15, "CULOTTES SKIRT", "LONG SKIRT", "MINI SKIRT" and "PANTS", and points allotted respectively to these kinds of bottom wear. In the top wear color table 16, and the bottom wear color table 17 are memorized "RED", "BLUE", "PINK" and "ORANGE", and points allotted respectively to these colors. These allotted points are decided based on predetermined fashion bases.

Similarly, the point converting table 13A (FIG. 13) comprises a cute wear table 13a, a sporty wear table 13b, an elegant wear table 13c and a unique wear table 13d, each of which expresses an image of wear. In each table, points in 5 point steps but not more than 100 points and corresponding messages are memorized.

The RAM 70 is provided with a display register 70a for temporarily storing data to be displayed on the display unit 8 and plural personal data areas 70b for storing names and corresponding points.

Figure 15:
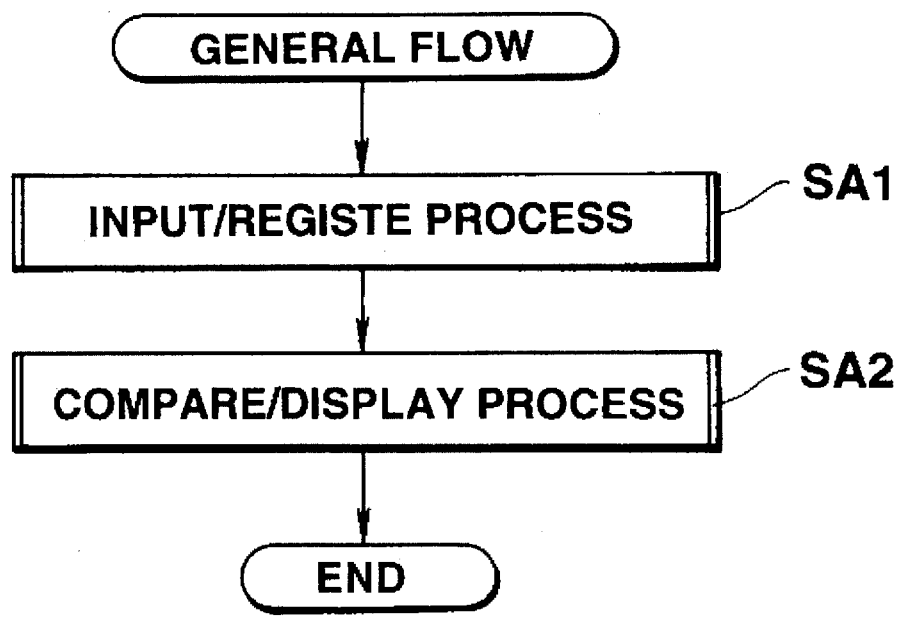
FIG. 15 is a general flowchart of operation of a third embodiment of the display apparatus.

Now, operation of the third embodiment of the display apparatus with the above structure will be described in accordance with flowcharts of FIGS. 15, 16A, 16B, and 18. FIG. 15 is a general flowchart of operation of the third embodiment. When a power is turned on, the CPU 5 starts operation to successively execute a input/register process at step SA1 and a compare/display process at step SA2.

Figure 16A:
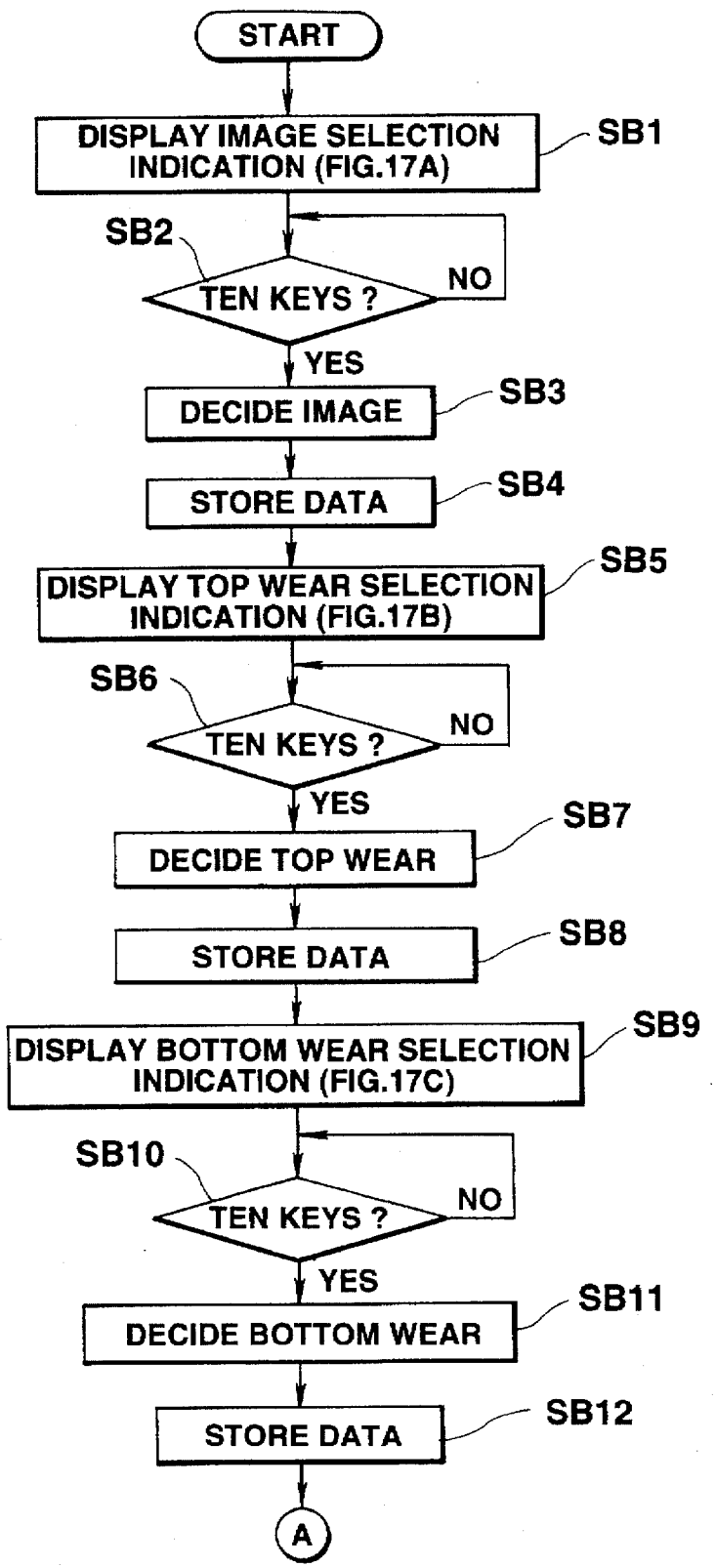
FIG. 16A is a (first half) flowchart of an input/register process in the third embodiment.
Figure 16B:
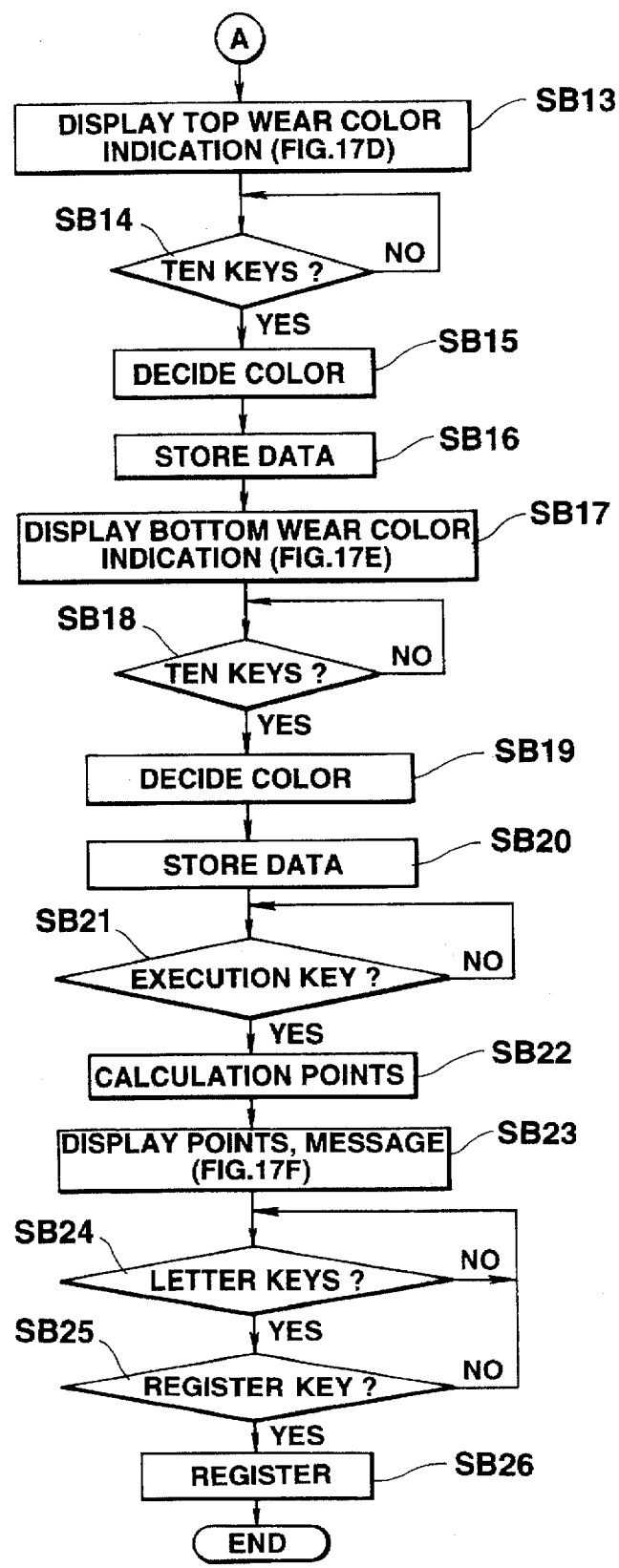
FIG. 16B is a (second half) flowchart of the input/register process of the third embodiment, which flowchart is to be connected to the flowchart of FIG. 16A.

The input/register process at step SA1 is executed in accordance with flowcharts of FIGS. 16A and 16B. A displaying process is executed at step SB1 of FIG. 16A to display an indication for selecting an image. In the display process at step SB1, image titles such as "1. CUTE", "2. SPORTY", "3. ELEGANT" and "4. UNIQUE" are displayed on the display unit 8, as shown in FIG. 17A. Then, operation goes to step SB2, where it is judged whether the ten keys 23 are operated. When anyone of the ten keys 23, "1" to "4", corresponding to the image titles is operated, it is judged YES at step SB2 and operation goes to step SB3, where an image of wear is selected. Image number data representative of the selected image is stored in a predetermined memory area of the RAM 70 at step SB4. For example, when the wear image "CUTE" is selected by operation of the ten keys 23, then image number data of "1" representative of the selected image "CUTE" is stored in the predetermined area of the RAM 70, as shown in FIG. 17A.

Then, a display process is executed at step SB5 to display an indication for selecting a top wear. In the display process at step SB5, the selected image "CUTE", together with "STYLE of TOP WEAR?", "1. BLOUSE", "2. T SHIRT", "3. SWEATER" and "4. CUT SEW", are displayed on the display unit 8 as shown in FIG. 17B. At step SB6, it is judged whether the ten keys 23 are operated. When anyone of the ten keys 23, "1" to "4", corresponding to the top wear is operated, it is judged YES at step SB6 and operation goes to step SB7, where one of the top wear "1" to "4" is selected. Then, data representative of the selected top wear is stored in a predetermined memory area of the RAM 70 at step SB8. For example, when the "1. BLOUSE" is selected by operation of the ten keys 23 as shown in FIG. 17B, then top wear number data of "1" representative of the selected top wear "BLOUSE" is stored in the predetermined area of the RAM 70.

Then, a display process is executed at step SB9 to display an indication for selecting a bottom wear. In the display process at step SB9, the selected wear image "CUTE", together with "STYLE of BOTTOM WEAR?", "1. CULOTTES SKIRT", "2. LONG SKIRT", "3. MINI SKIRT" and "4. PANTS" are displayed on the display unit 8, as shown in FIG. 17C. At step SB10, it is judged whether the ten keys 23 are operated. When anyone of the ten keys 23, "1" to "4", corresponding to the bottom wear is operated, it is judged YES at step SB10 and operation goes to step SB11, where one of the bottom wear "1" to "4" is selected. Then, data representative of the selected bottom wear is stored in a predetermined memory area of the RAM 70 at step SB12. For example, when the "3. MINI SKIRT" is selected by operation of the ten keys 23 as shown in FIG. 17C, then bottom wear number data of "3" representative of the selected skirt "MINI SKIRT" is stored in the predetermined area of the RAM 70.

At step SB13 of FIG. 16B, a display process is executed to display an indication for selecting a color of top wear. In the display process at step SB13, the selected image "CUTE", together with "TOP WEAR COLOR?", "1. RED", "2. BLUE", "3. PINK" and "4. ORANGE" are displayed on the display unit 8, as shown in FIG. 17D. Then, it is judged at step SB14 whether the ten keys 23 are operated. When anyone of the ten keys 23, "1" to "4", corresponding to the top wear colors is operated, it is judged YES at step SB14 and operation goes to step SB15, where one of the top wear colors "1" to "4" is selected. Then, data representative of the selected top wear color is stored in a predetermined memory area of the RAM 70 at step SB16. For example, when the "3. PINK" is selected by operation of the ten keys 23 as shown in FIG. 17D, then color number data of "3" representative of the selected color "PINK", the color of the selected top wear (blouse), is stored in the predetermined area of the RAM 70.

At step SB17 of FIG. 16B, a display process is executed to display an indication for selecting a bottom wear color. In the displaying process at step SB17, the selected wear image "CUTE", together with "BOTTOM WEAR COLOR?", "1. RED", "2. BLUE", "3. PINK" and "4. ORANGE" are displayed on the display unit 8, as shown in FIG. 17E. Then, it is judged at step SB18 whether the ten keys 23 are operated. When anyone of the ten keys 23, "1" to "4", corresponding to the bottom wear colors is operated, it is judged YES at step SB18 and operation goes to step SB19, where one of the bottom wear colors "1" to "4" is selected. Then, data representative of the selected bottom wear color is stored in a predetermined memory area of the RAM 70 at step SB20. For example, when the "4. ORANGE" is selected by operation of the ten keys 23, then color number data of 4 representative of the selected color "ORANGE", the color of the selected bottom wear (mini skirt) is stored in the predetermined area of the RAM 70.

At step SB22, points to be allotted to the selected wear are calculated using the evaluation value converting table 12A of FIG. 12. Since the wear image "CUTE" is selected in the present embodiment, the cute wear table 12a is used. Points allotted respectively to the selected top wear "BLOUSE", the selected bottom wear "MINI SKIRT", the selected top wear color "PINK" and the selected bottom wear color "ORANGE" are read out from the top wear table 14, the bottom wear table 15, the top wear color table 16 and the bottom wear color table 17 of the cute wear table 12a. More specifically, the following points:

"BLOUSE" in the top wear table 14: 25 points

"MINI SKIRT" in the bottom wear table 15: 25 points

"PINK" in the top wear color table 16: 15 points

"ORANGE" in the bottom wear color table 17: 10 points are read out from the respective tables and total points 75 (the sum of 25, 25, 15 and 10 points) are obtained for the selected wear.

At step SB23, the calculated points 75 and a message are displayed. The message corresponding to the calculated points is read out from the cute wear table 13a of the point converting table 13 (FIG. 13). At step SB23, the selected wear image "CUTE", the calculated points "75" and the read out message "YOU LOOK", as shown in FIG. 17F.

Then, operations of the letter keys 22 is discriminated at step SB24 and operation of the register key 25 is detected at step SB25. A loop process (SB24 to SB25 to SB24) are repeatedly executed until the register key 25 is operated. At this time, an indication "NAME?" is displayed on the display unit 8 as shown in FIG. 17G. When, responsive to the indication "NAME?", a name "AKEMI" is entered by operating the letter keys 22 at step SB25 as shown in FIG. 17H, and the register key 25 is operated at step SB25, then operation goes to step SB26, where a registering process is executed. In the registering process at step SB26, the name "AKEMI" and the calculated points "75" are stored in combination in the personal data area 70b of the RAM 70 of FIG. 14.

When a name "MIKA" is entered by operating the letter keys 22, the register key 25 is operated after the above input/register process is executed again. Then, the name "MIKA" and a calculated points "85" are stored in combination in the personal area 70b of the RAM 70 as shown in FIG. 14.

Figure 18:
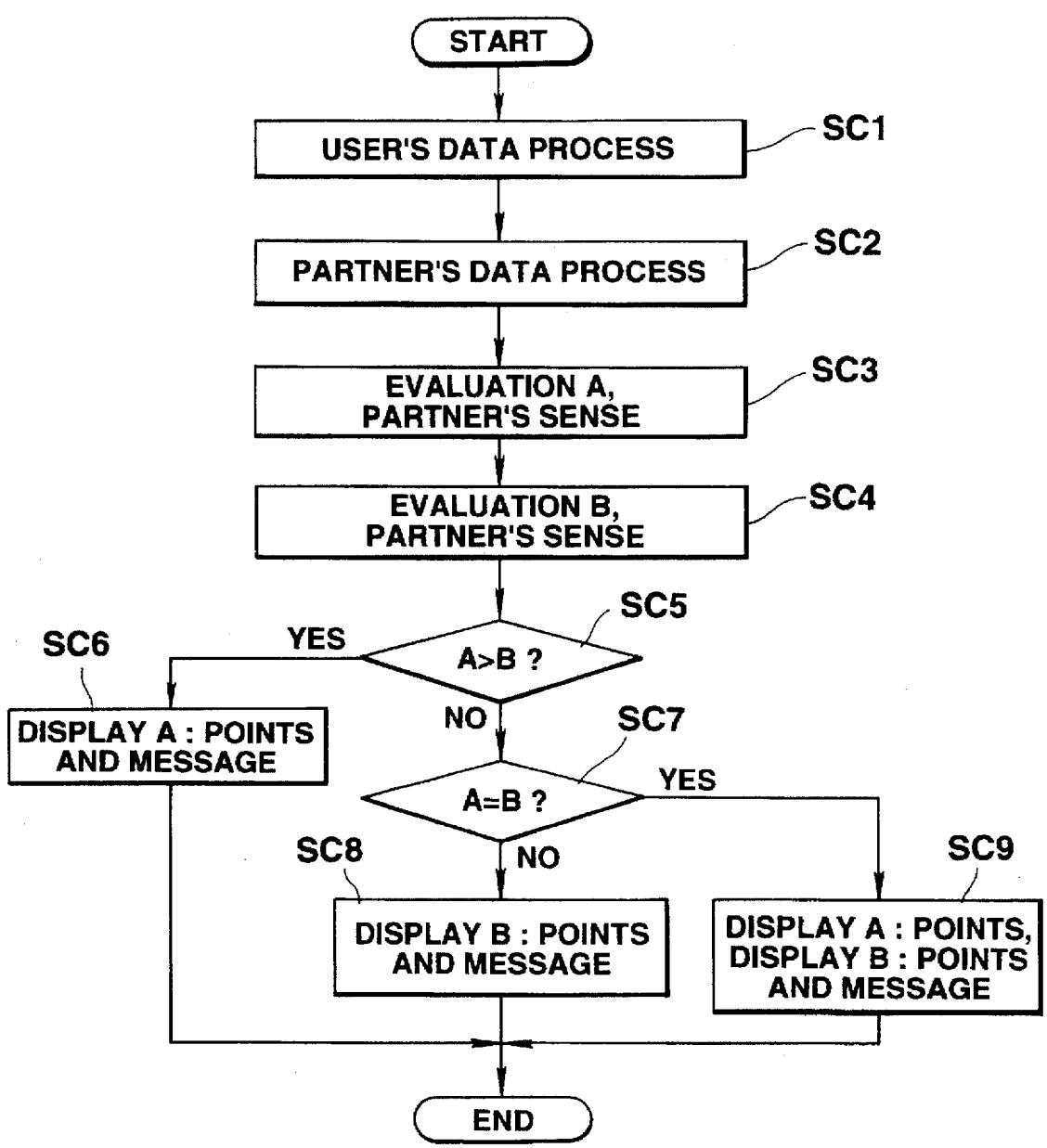
FIG. 18 is a flowchart of a compare/display process.

Meanwhile, the compare/display process is executed at step SA2 in accordance with the flowchart of FIG. 18. In the compare/display process, a self data search process and a partner data search process are successively performed at steps SC1 and SC2. In the self data search process at step SC1, an indication "YOUR NAME?" is displayed on the display unit 8 and names stored in the personal data area 70b are successively displayed on the display unit 8 responsive to every operation of the search key 26. When the execution key 24 is operated at the time the user's name is displayed, a point corresponding to the name "AKEMI" is selected as the user's own allotted point data.

In the partner data search process at step SC2, an indication "PARTNER'S DATA?" is displayed on the display unit 8 and names stored in the personal data area 70b are successively displayed one by one together with the indication "PARTNER'S DATA?" on the display unit 8 responsive to every operation of the search key 26. When the execution key 4 is operated at the time the partner's name is displayed, the name "MIKA" and corresponding data (points) are selected as the partner's allotted point data.

Figures 19C, 19D:
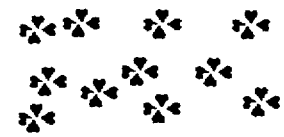

At step SC3 of FIG. 18, the user's own allotted point data selected at step SC1 is adopted as evaluation A on the user's own sense and, at step SC4, the partner's allotted point data selected at step SC2 is adopted as evaluation B on the partner's sense. Then, it is judged at step SC5 whether the evaluation A is larger than the evaluation B. At this time, an illustration of flowers is displayed on the display unit 8 as shown in FIG. 19C. When YES at step SC5 and the evaluation A is larger than the evaluation B, the evaluation A (points) and a corresponding message are displayed at step SC6. When NO at step SC5, it is judged at step SC7 whether the evaluation A is equal to the evaluation B. When NO at step SC7, this means that the evaluation A is smaller than the evaluation B. Therefore, the evaluation B (points) and a corresponding message are displayed at step SC8. When YES at step SC7 and the evaluation A is equal to the evaluation B, the evaluation A, the evaluation B and a message are displayed at step SC9.

Accordingly, since the evaluation A is 75 points and the evaluation B is 85 points for the wear image "CUTE", the process of SC8 is executed, wherein 85 points for the wear image "CUTE" and the name "MIKA" are displayed. And a predetermined message stored in a memory area (not shown) of the ROM 60, "YOU LOOK CUTE!" is displayed as shown in FIG. 19D. From the indication displayed on the display unit 8, the user can confirm who, the user or the partner is cuter. With respect to other images, similar processes are performed and the user can obtain good advice on the user's choice of clothing from the present display apparatus.

Fourth Embodiment

FIGS. 20A–20I are views illustrating transitive indications displayed on a display unit in a fourth embodiment of the present invention. In processes corresponding to the indications of FIGS. 20A–20D, a top wear, a bottom wear, a top wear color and a bottom wear color are designated before deciding upon an image, contrary to the third embodiment. Then, a wear image is selected from among the images shown in FIG. 20E with respect to the clothing designated as described above. Therefore, the fourth embodiment of the display apparatus indicates, for which of the images: "CUTE", "SPORTY", "ELEGANT" and "UNIQUE", the designated clothing is judged best, or for which images the designated clothing obtains the highest score. In this manner, evaluation point for the user's sense on fashion is obtained and displayed.

As described, in the third and fourth embodiments, it may be determined based on a predetermined objective fashion standard, to what degree a combination of top and bottom wear satisfies a particular image, or what wear image satisfies a combination of clothing. With the present display apparatus, the user can learn his own fashion sense based on the objective fashion standard.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A display system comprising:

a display;

an evaluation data memory for storing a plurality of evaluation data relating to a plurality of types of top wear and a plurality of types of bottom wear, wherein each type of top wear has a respective plurality of colors and each type of bottom wear has a respective plurality of colors, and wherein each of said plurality of evaluation data respectively corresponds to a combination of one of the plurality of types of top wear having one of the respective plurality of colors thereof with one of the plurality of types of bottom wear having one of the respective plurality of colors thereof;

top wear display means for displaying the plurality of types of top wear and the respective plurality of colors thereof on said display;

a top wear designating device for designating one of the displayed plurality of types of top wear and one of the displayed respective plurality of colors of the designated type of top wear;

a top wear data storage device for storing top wear data corresponding to the type and color of top wear designated by said top wear designating device;

bottom wear display means for displaying the plurality of types of bottom wear and the respective plurality of colors thereof on said display;

a bottom wear designating device for designating one of the displayed plurality of types of bottom wear and one of the displayed respective plurality of colors of the designated type of bottom wear;

a bottom wear data storage device for storing bottom wear data corresponding to the type and color of bottom wear designated by said bottom wear designating device; and evaluation display means for reading from said evaluation data memory one of the plurality of evaluation data corresponding to the combination of the designated type and color of top wear designated by said top wear designating device with the designated type and color of bottom wear designated by said bottom wear designating device, and for displaying the read out evaluation data on said display; and wherein the image represented by the evaluation data is expressed in terms of a plurality of scaled image items.

2. A display system according to claim 1, wherein each of the plurality of evaluation data stored in said evaluation data memory represents an image which is derived from the combination of one of the plurality of types of top wear having one of the respective plurality of colors thereof with one of the plurality of types of bottom wear having one of the respective plurality of colors thereof.

3. A display system comprising:

display;

an evaluation data memory for storing a plurality of evaluation data relating to a plurality clothing colors and a plurality of types of accessories to be carried, wherein each type of accessory has a respective plurality of colors, and wherein each of said evaluation data corresponds to a respective combination of one of the plurality of clothing colors with one of the plurality of types of accessories having one of the respective colors thereof;

clothing color display means for displaying the plurality of clothing colors on said display;

a clothing color designating device for designating one of the displayed plurality of clothing colors;

a clothing color data storage device for storing clothing color data corresponding to the clothing color designated by said clothing color designating device; and accessory display means for displaying the plurality of types of accessories and the respective plurality of colors thereof on said display;

an accessory designating device for designating one of the displayed plurality of types of accessories and one of the displayed respective plurality of colors of the designated type of accessory;

an accessory data storage device for storing accessory data corresponding to the type and color of accessory designated by said accessory designating device; and evaluation display means for reading from said evaluation data memory one of the plurality of evaluation data corresponding to the combination of the clothing color designated by said clothing color designating device with the designated type and color of accessory designated by said accessory designating device, and for displaying the read out evaluation data on said display; and wherein the image represented by the evaluation data is expressed in terms of a plurality of scaled image items.

4. A display system according to claim 3, wherein each of the plurality of evaluation data stored in said evaluation data memory represents an image derived from the combination of one of the plurality of clothing colors with one of the plurality of types of accessories having one of the respective plurality of colors thereof.

5. A display system comprising:

a display;

a memory for storing a plurality of types of images, a plurality of types of clothing, and a plurality of evaluation data, each evaluation data respectively representing a degree of image achieved by one of the plurality of types of clothing in terms of one of the plurality of types of images;

image display means for displaying the plurality of types of images on said display;

an image designating device for designating one of the displayed plurality of types of images;

clothing display means for displaying the plurality of types of clothing, including at least one of top wear and bottom wear, on said display;

a clothing designating device for designating one of the displayed plurality of types of clothing;

reading means for reading out from said memory one of the plurality of evaluation data representing the degree of image achieved by the designated one of the plurality of types of clothing in terms of the designated one of the plurality of types of images; and evaluation display means for displaying the evaluation data read out by said reading out means on said display.

6. A display system according to claim 5, wherein each of the plurality of evaluation data represents an objective impression resulting from at least one of the appearance and color of a given one of the plurality of types of clothing in terms of a given one of the plurality of types of images.

* * * * *